(12) United States Patent
Raasch

(10) Patent No.: US 12,547,020 B2
(45) Date of Patent: Feb. 10, 2026

(54) MYOPIA CONTROL OPHTHALMIC DEVICE

(71) Applicant: Ohio State Innovation Foundation, Columbus, OH (US)

(72) Inventor: Thomas Raasch, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 167 days.

(21) Appl. No.: 18/501,744

(22) PCT Filed: May 6, 2022

(86) PCT No.: PCT/US2022/028120
§ 371 (c)(1),
(2) Date: Nov. 3, 2023

(87) PCT Pub. No.: WO2022/236087
PCT Pub. Date: Nov. 10, 2022

(65) Prior Publication Data
US 2024/0310656 A1    Sep. 19, 2024

Related U.S. Application Data

(60) Provisional application No. 63/241,905, filed on Sep. 8, 2021, provisional application No. 63/185,185, filed on May 6, 2021.

(51) Int. Cl.
*G02C 7/04*    (2006.01)
(52) U.S. Cl.
CPC ............. *G02C 7/045* (2013.01); *G02C 7/047* (2013.01); *G02C 7/049* (2013.01); *G02C 2202/24* (2013.01)
(58) Field of Classification Search
CPC ........ G02C 7/045; G02C 7/047; G02C 7/049; G02C 2202/24
See application file for complete search history.

(56) References Cited

U.S. PATENT DOCUMENTS 9,612,454 B2    4/2017 Wu
11,493,782 B2    11/2022 Simard et al.
(Continued)

FOREIGN PATENT DOCUMENTS

CA    3116454 A1    4/2020
CA    3147871 A1    1/2021
(Continued)

OTHER PUBLICATIONS

Extended European Search Report, dated Mar. 13, 2025, received in connection with corresponding EP Patent Application No. 22799700.4.
(Continued)

*Primary Examiner* — Tuyen Tra
(74) *Attorney, Agent, or Firm* — Meunier Carlin & Curfman LLC

(57) ABSTRACT

An exemplary method and apparatus are disclosed to perform myopia control using an ophthalmic device (contact lens) comprising a center region configured to correct vision at a first correction power (spherical or sphero-cylindrical) and a peripheral region that surrounds the central region, wherein the peripheral region comprises a plurality of distinct facet surfaces configured to under correct (or overcorrect) the vision at a second correction power, each of the plurality of distinct facet surfaces having a varying power in both (i) a first direction radially extending from a central location of the center region to a perimeter of the ophthalmic device and (ii) a second direction perpendicular to the first direction.

35 Claims, 23 Drawing Sheets

(56) References Cited

U.S. PATENT DOCUMENTS

| | | |
|---|---|---|
| 2006/0215109 A1 | 9/2006 | Lindacher et al. |
| 2009/0257026 A1 | 10/2009 | Vaarnas et al. |
| 2016/0377884 A1 | 12/2016 | Lau et al. |
| 2017/0131567 A1 | 5/2017 | To et al. |
| 2018/0275427 A1 | 9/2018 | Lau et al. |
| 2019/0033619 A1 | 1/2019 | Neitz et al. |
| 2019/0235279 A1 | 8/2019 | Hones et al. |
| 2020/0073147 A1 | 3/2020 | Bakaraju et al. |
| 2020/0089023 A1 | 3/2020 | Zhou et al. |

FOREIGN PATENT DOCUMENTS

| | | |
|---|---|---|
| CN | 110618542 A | 12/2019 |
| CN | 210690971 | 6/2020 |
| EP | 3561578 | 10/2019 |
| WO | 2009017403 A1 | 2/2009 |
| WO | 2020141375 | 7/2020 |
| WO | 2021056059 A1 | 4/2021 |

OTHER PUBLICATIONS

International Search Report and Written Opinion, dated Aug. 19, 2022, received in connection with corresponding International Patent Application No. PCT/US2022/028120.

Aller, Thomas A., Maria Liu, and Christine F. Wildsoet. "Myopia control with bifocal contact lenses: a randomized clinical trial." Optometry and Vision Science 93.4 (2016): 344-352.

Chamberlain, Paul, et al. "A 3-year randomized clinical trial of MiSight lenses for myopia control." Optometry and Vision Science 96.8 (2019): 556-567.

Cheng, Desmond, et al. "Effect of bifocal and prismatic bifocal spectacles on myopia progression in children: three-year results of a randomized clinical trial." JAMA ophthalmology 132.3 (2014): 258-264.

Cheng, Xu, et al. "Soft contact lenses with positive spherical aberration for myopia control." Optometry and Vision Science 93.4 (2016): 353-366.

Lipson, Michael J., Moya M. Brooks, and Bruce H. Koffler. "The role of orthokeratology in myopia control: a review." Eye & contact lens 44.4 (2018): 224-230.

Liu, Tao, and Larry N. Thibos. "Variation of axial and oblique astigmatism with accommodation across the visual field." Journal of vision 17.3 (2017): 24-24.

Na Park, Han, et al. "Visually-driven ocular growth in mice requires functional rod photoreceptors." Investigative ophthalmology & visual science 55.10 (2014): 6272-6279.

Si, Jun-Kang, et al. "Orthokeratology for myopia control: a meta-analysis." Optometry and Vision Science 92.3 (2015): 252-257.

Smith, Earl L., et al. "Peripheral vision can influence eye growth and refractive development in infant monkeys." Investigative ophthalmology & visual science 46.11 (2005): 3965-3972.

Song, Hongxin, et al. "Variation of cone photoreceptor packing density with retinal eccentricity and age." Investigative ophthalmology & visual science 52.10 (2011): 7376-7384.

Walline, Jeffrey J. "Myopia control: a review." Eye & contact lens 42.1 (2016): 3-8.

Walline, Jeffrey J., et al. "Effect of high add power, medium add power, or single-vision contact lenses on myopia progression in children: the BLINK randomized clinical trial." Jama 324.6 (2020): 571-580.

Walline, Jeffrey J., et al. "Multifocal contact lens myopia control." Optometry and Vision Science 90.11 (2013): 1207-1214.

International Preliminary Report on Patentability dated Nov. 16, 2023.

| | | |
|---|---|---|
| PUPIL SIZE | 3.5 | DIAMETER (mm) |
| CENTER OZ | 4 | OZ DIAM, CENTER (mm) |
| VF ANGLE | 25 | ECCENTRICITY (deg) |
| # SEGS | 6 | ☑ CORRECT ECC CYL |
| # RAYS | 25000 | |
| TARGET SIZE | 100 | 20/xx |
| SEG ADD | 2 | D |
| RING ADD | 2 | D |
| DIST POWER | 0 | D |
| AZIMUTH | 0 | MERIDIAN (deg) |
| LENS ROT | 0 | LENS ROTATION (deg) |
| OC DIST | 3 | mm TO OPT CENTER OF SEGS |
| ASTIG DESIGN | 25 | ECC ASTIG CORRECTION ANGLE |

TARGET
- ● E
- ○ +
- ○ DOT
- ○ V BAR
- ○ H BAR
- ○ L
- ○ STAR

☐ SEGS ONLY
☑ INCLUDE HOA
☑ INCLUDE SCATTER

*FIG. 7*

MYOPIA CONTROL OPHTHALMIC DEVICE

RELATED APPLICATION

This application is a U.S. National Stage application filed under 35 U.S.C. § 371 of PCT/US2022/028120 filed May 6, 2022, which claims the benefit of priority to U.S. Provisional Application No. 63/185,185, filed May 6, 2021 and U.S. Provisional Application No. 63/241,905, filed Sep. 8, 2021, each of which is hereby incorporated herein by reference in their entirety.

TECHNICAL FIELD

The present disclosure relates to an ophthalmic device, in particular, an ophthalmic device such as a contact lens configured to slow the progression of nearsightedness, e.g., in children.

BACKGROUND

Myopia control describes a specific set of treatments to slow the progression of nearsightedness, typically in children, including through the use of multifocal contact lenses, orthokeratology lenses, and myopia control glasses. Myopia control measures typically are prescribed by an optometrist or an ophthalmologist.

It has been observed, for example, that multifocal contacts can help slow the progression of myopia in some children. One study found that nearsighted children who wore multifocal lenses on a daily basis had about a 50 percent reduction in the progression of their myopia when compared with similarly nearsighted children who wore regular soft contacts for the same period.

Multifocal contact lenses are typically designed to provide clear vision at all distances for people to address presbyopia, which are refractive errors such as nearsightedness, farsightedness, and/or astigmatism attributed to normal age loss of near focusing ability.

Orthokeratology lenses (ortho-k) are specially designed gas permeable contact lenses fitted that can be worn overnight to provide myopia control. Fitting ortho-k lenses can be a time-consuming process that requires extensive expertise. There is growing recognition of a worldwide "myopia epidemic," and numerous industrial, health and governmental organizations are addressing that epidemic.

There is a benefit to improving myopia control.

SUMMARY

An exemplary method and apparatus are disclosed to perform myopia control using an ophthalmic device (e.g., contact lens) comprising a center region configured to correct vision at a first correction power (spherical or sphero-cylindrical) and a peripheral region that surrounds the central region, wherein the peripheral region comprises a plurality of distinct facet surfaces configured to under correct (or overcorrect) the vision at a second correction power, each of the plurality of distinct facet surfaces having a varying power in both (i) a first direction radially extending from a central location of the center region to a perimeter of the ophthalmic device and (ii) a second direction perpendicular to the first direction. Also described are methods to generate the myopia control contact lens.

In an aspect, a method is disclosed to perform myopia control using an ophthalmic device (contact lens) comprising a center region configured to correct vision at a first correction power (spherical or sphero-cylindrical) and a peripheral region that surrounds the central region, wherein the peripheral region comprises a plurality of distinct facet surfaces configured to under correct (or overcorrect) the vision at a second correction power, each of the plurality of distinct facet surfaces having a varying power in both (i) a first direction radially extending from a central location of the center region to a perimeter of the ophthalmic device and (ii) a second direction perpendicular to the first direction.

In some embodiments, the plurality of distinct facet surfaces are identical and equally spaced apart radially from one another.

In some embodiments, the plurality of distinct facet surfaces are toric to compensate for increased peripheral astigmatism inherent in eyes, with each faceted surface being located at a meridian that is equally spaced apart radially from another facet surface.

In some embodiments, each of the plurality of distinct facet surfaces has a correction area that is configured to provide the second correction power, wherein the correction area is sufficiently large to provide myopic defocus for a region of the peripheral visual field.

In some embodiments, at least one of the plurality of distinct facet surfaces has spherical curvature or radially symmetric curvature.

In some embodiments, at least one of the plurality of distinct facet surfaces has sphero-cylindrical curvature.

In some embodiments, the plurality of distinct facet surfaces are each located at a same radial position (i.e., having a center at a same radius position).

In some embodiments, one or more of the plurality of distinct facet surfaces are located at different radial positions (i.e., having centers at different radius positions).

In another aspect, an ophthalmic device (contact lens) is disclosed comprising a center region configured to correct vision at a first correction power (spherical or sphero-cylindrical) and a peripheral region that surrounds the central region, wherein the peripheral region comprises a plurality of distinct facet surfaces configured to under correct (or overcorrect) the vision at a second correction power, each of the plurality of distinct facet surfaces having a varying power in both (i) a first direction radially extending from a central location of the center region to a perimeter of the ophthalmic device and (ii) a second direction perpendicular to the first direction.

In some embodiments, the plurality of distinct facet surfaces are identical and equally spaced apart radially from one another.

In some embodiments, the plurality of distinct facet surfaces are elongated a radial direction, each faceted surface being located at a meridian that is equally spaced apart radially from another facet surface.

In some embodiments, each of the plurality of distinct facet surfaces has a correction area that is configured to provide the second correction power, wherein the correction area is sufficiently large to provide myopic defocus for a region of the peripheral visual field.

In some embodiments, at least one of the plurality of distinct facet surfaces has spherical curvature or radially symmetric curvature.

In some embodiments, at least one of the plurality of distinct facet surfaces has a sphero-cylindrical curvature.

In some embodiments, the plurality of distinct facet surfaces are each located at a same radial position (i.e., having a center at a same radius position).

In some embodiments, one or more of the plurality of distinct facet surfaces are located at different radial positions (i.e., having centers at different radius positions).

In another aspect, a method is disclosed comprising obtaining, by a processor, a set of parameters; and generating, by the processor, using the set of parameters, an ophthalmic device comprising a center region configured to correct vision at a first correction power and a peripheral region that surrounds the central region, wherein the peripheral region comprises a plurality of distinct facet surfaces configured to adjust the vision at a second correction power, each of the plurality of distinct facet surfaces having a varying power in both (i) a first direction radially extending from a central location of the center region to a perimeter of the ophthalmic device and (ii) a second direction perpendicular to the first direction, and wherein the generated ophthalmic device is used to fabricate an ophthalmic device used for myopia control.

BRIEF DESCRIPTION OF THE DRAWINGS

The skilled person in the art will understand that the drawings described below are for illustration purposes only.

FIG. 7 shows an example of the graphical user interface 800 employed in the study that receives a set of lens parameters and ray-tracing analysis parameters.

DETAILED DESCRIPTION

Each and every feature described herein, and each and every combination of two or more of such features, is included within the scope of the present invention, provided that the features included in such a combination are not mutually inconsistent.

Some references, which may include various patents, patent applications, and publications, are cited in a reference list and discussed in the disclosure provided herein. The citation and/or discussion of such references is provided merely to clarify the description of the present disclosure and is not an admission that any such reference is "prior art" to any aspects of the present disclosure described herein. In terms of notation, "[n]" corresponds to the $n^{th}$ reference in the list. All references cited and discussed in this specification are incorporated herein by reference in their entireties and to the same extent as if each reference was individually incorporated by reference.

Example Myopia Control Ophthalmic Device

Figure 1:
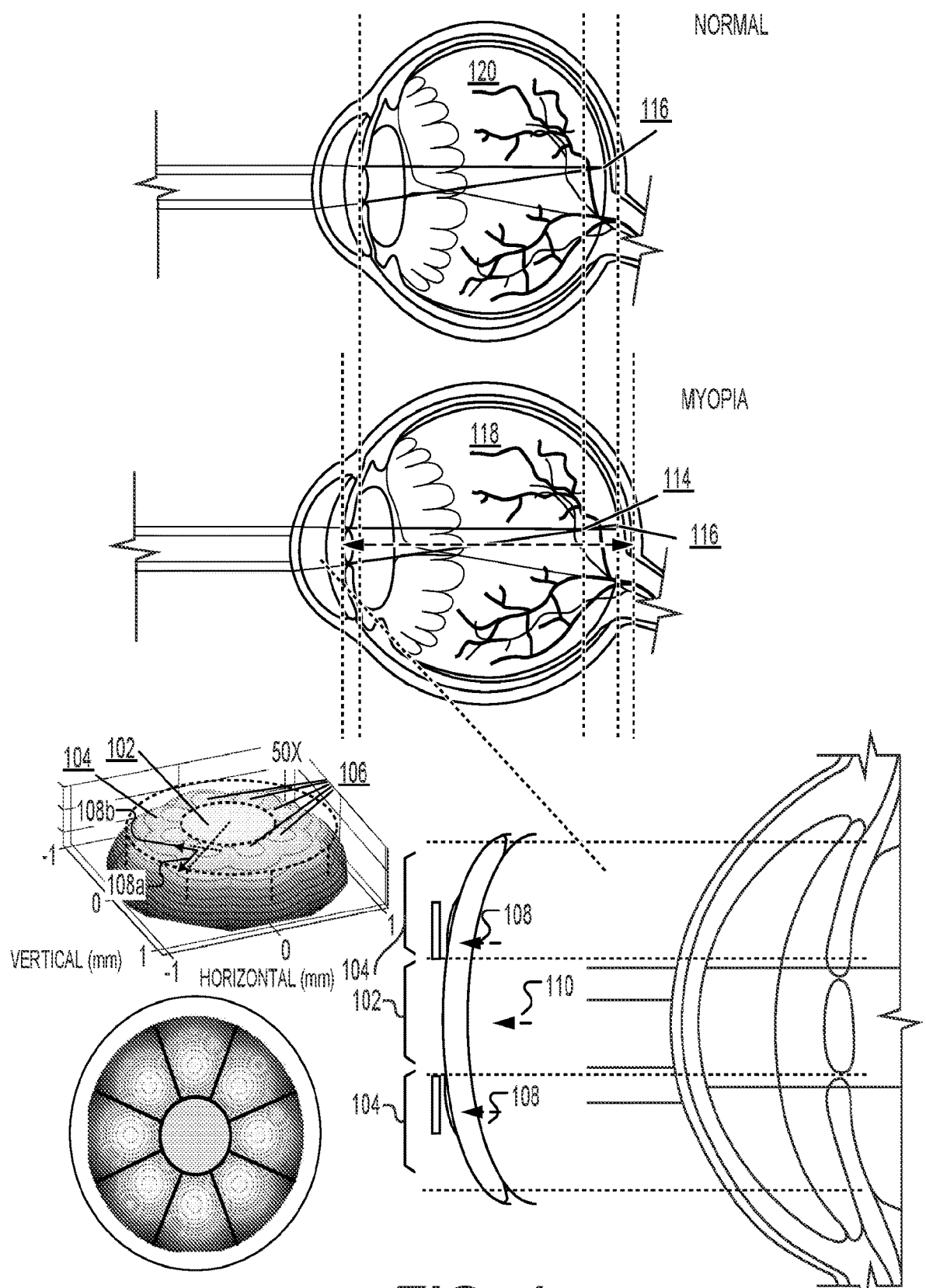
FIG. 1 shows an example myopia control ophthalmic device in accordance with an illustrative embodiment.

FIG. 1 shows an example myopia control ophthalmic device 100 (shown as a myopia control contact lens 100a) comprising a center region 102 configured to correct vision at a first correction power (spherical or sphero-cylindrical) and a peripheral/annular region 104 comprising a plurality of facet surfaces 106 (also referred to herein as a segment) that surrounds the center region 100 to provide a second correction power that produces myopic defocus in the annual zone 104 surrounding the fovea by under correcting the vision in that zone 104. Each of the plurality of distinct facet surfaces 106 has a varying power in both (i) a first direction 108a radially extending from a central location of the center region to a perimeter of the ophthalmic device and (ii) a second direction 108b perpendicular to the first direction 108a. The myopic defocus (shown as arrow 110) produces a stop signal to myopia-associated eye growth (shown as myopia eye growth direction 112).

In the example shown in FIG. 1, the peripheral region 104 has a plurality of distinct facet surfaces 106 each comprising a spherical lens or generally spherical height contours that are preferably uniformly sized and uniformly spaced apart with respect to a nearby facet to collectively produce myopic defocus to under correct (through can also be defined to overcorrect) the vision at the second correction power or second effective correction power. In alternative embodiments, the spherical lens or generally spherical lens height contours has the same effective power as the nearby facets but differs in size. In certain embodiments, the spherical lens or generally spherical lens height contours has different power as a nearby facet and produces a different power as the nearby facets.

Myopia is an eye disorder where light focuses in front of, instead of on, the retina. This can cause distant objects to appear blurry while nearby objects to appear normal. In the example shown in FIG. 1, the light focuses on a location 114 in front of the retina 116 due to an elongation of the eye axial length (also referred to as "axial myopia"), as well as due to excessive or increased curvature of one or more of the refractive surfaces of the eye, especially the cornea (also referred to as "curvature myopia"). In some embodiments, the change in focus can be attributed to a change in the refractive condition of the eye (also referred to as "refractive myopia").

In FIG. 1, the diagram of the myopic eye 118 is shown normalized to the same size as the normal eye 120. It should be appreciated that newborn eyes are typically about 16.5 millimeters in length and typically grows to about 19 mm for young children. The eyes typically will grow to about 24 millimeters for an adult (by age 18-21). The exemplary myopia control ophthalmic device 100 can be prescribed to children based on the patient's current eye size. The same condition is true when prescribing to adults.

Figure 2A:
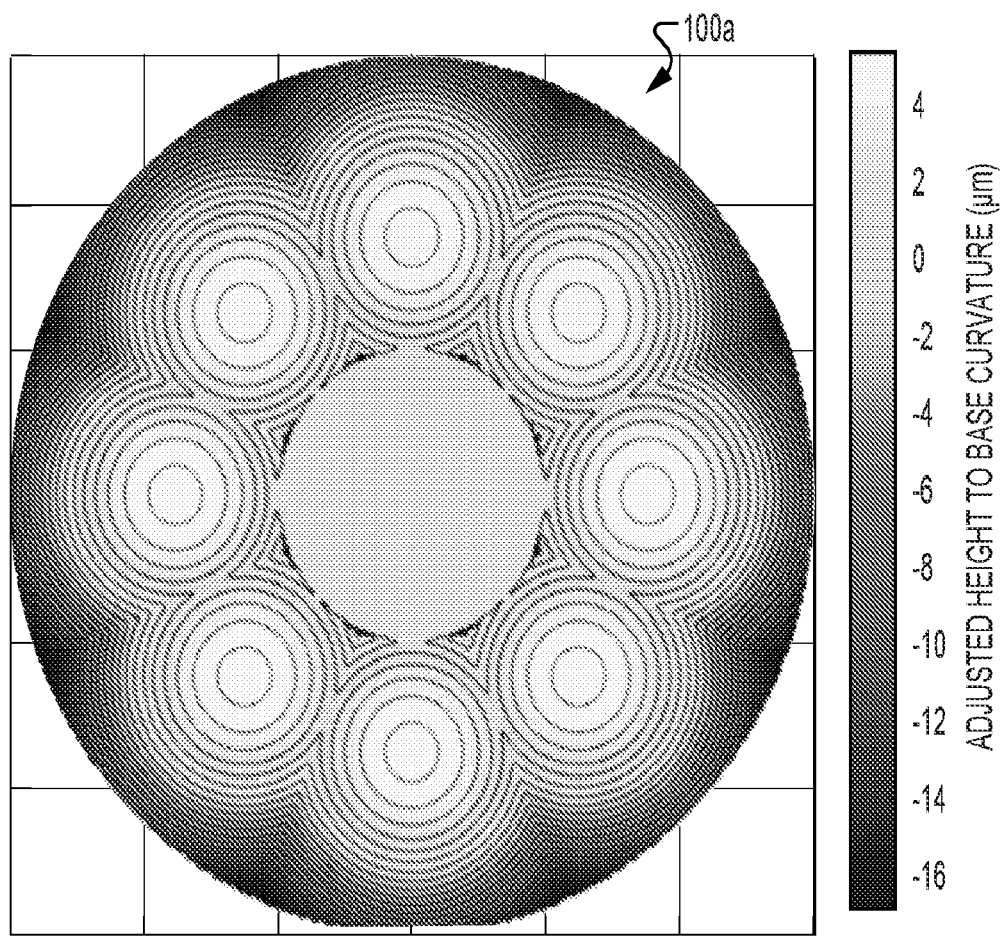
FIGS. 2A, 2B, 3A, 3B, and 3C show example facets lens configuration of the myopia control contact lens of FIG. 1 in accordance with an illustrative embodiment.
Figure 3A:
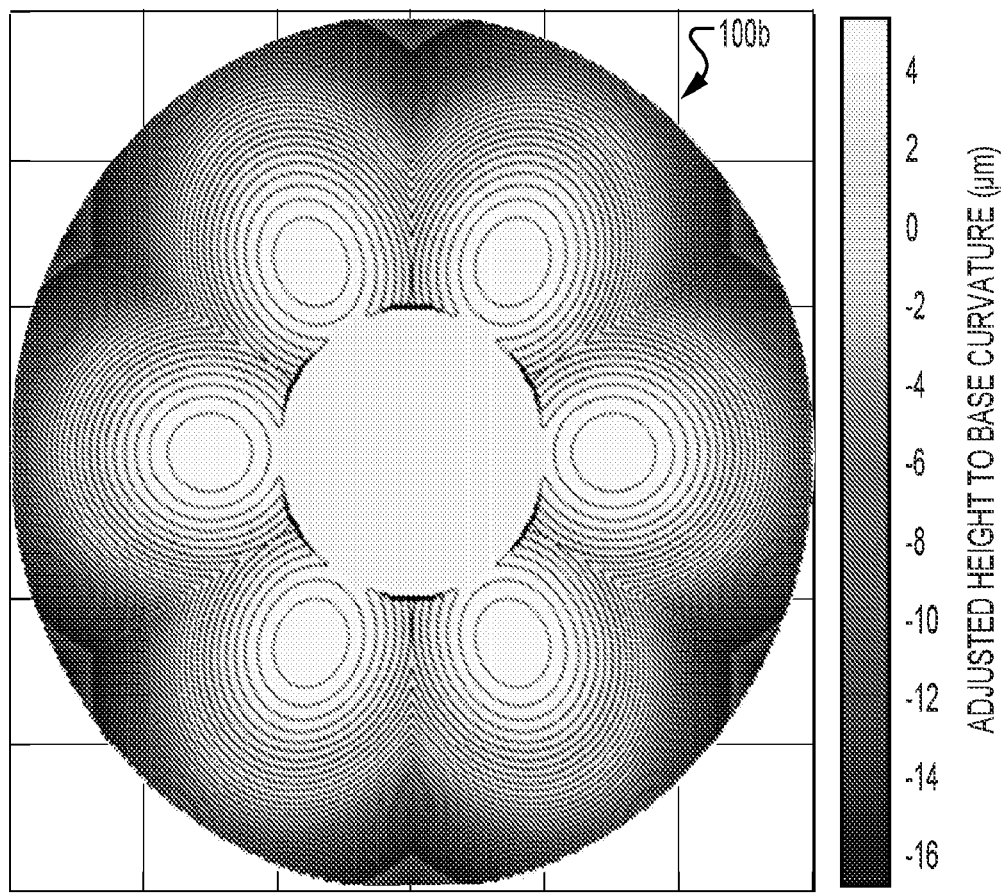

In the exemplary method and apparatus, myopic defocus is created through a plurality of facets, each defined by a wedge-shaped segment that forms the annular region of the ophthalmic apparatus. The segments are bounded by (i) the sectoral borders with a nearby facet, (ii) radially by the central optic zone, and (iii) by the outer facet diameter. Each facet has a base segment (e.g., lowest contour) that extends inward into the lens surface and changes in height to form a set of a spherical lens or generally spherical lens contours that is typically higher than the height of the center optical zone. In some embodiments, the facets may have a maximum height that is the same or less than the center optical zone. The facets has a distinct (i.e., different) corrective power to the central region 102 and is sized to produce a strong stop signal to slow or stop growth of the eye, thus impeding, or correcting for, the formation of myopia. The size of the spherical lens or generally spherical lens can be quantified in a number of ways. The size, shape, and area of these facets are a property of the number of facets, the size of the central optic zone, and the radial extent of the facets. FIG. 2A shows a lens with eight facets in which each facet is bounded by meridians 45 degrees apart FIG. 3A shows a lens with six facets in which each facet is bounded by meridians 60 degrees apart. Radially, the facets are bounded by the central optic zone boundary and the outer radial boundary of the facets. In most instances, the radian length of the facets are about 2 mm to 6 mm from the the central optic zone boundary and the area of each facet can be similar to or equal to the area of the central optic zone. In the example shown in FIG. 2A, the area of each facet is equal to the area of the central optical zone. Other dimensions will result in a ratio of facet area to central optic zone area from 30% to 150%. Per this quantification, the size (area) ratio of the area of the spherical lens or generally spherical lens to the center region of the ophthalmic apparatus at the defined added power is about 30%, about 35%, about 40%, about 45%, about 50%, about 55%, about 60%, about 65%, about 70%, about 75%, about 80%, about 85%, about 90%, about 95%, about 100% (same), about 105%, about 110%, about 115%, about 120%, about 125%, about 130%, about 140%, about 145%, and about 150% (where "about" refers to ±2.5% percent). In some embodiments, "about" refers to ±1% percent.

In the example shown in FIG. 1, the faceted annular lens 106 of the exemplary ophthalmic apparatus 100 each has power in more than one axis of meridians, maintaining the substantially higher or full stop signal strength in all meridians. Conventional myopia control lens, e.g., as shown in FIG. 11, in contrast, may have an annulus having the nominal add power in one meridian (e.g., the radial meridian) and thus can produce little or no power in the perpendicular meridian that contributes to the stop signal to slow or stop myopia-related growth. That difference in power across meridians defines astigmatism and can produce less strength in the stop signal to myopic eye growth.

In recent years, several "myopia control" contact lens designs have become commercially available. Those lenses have been evaluated in controlled clinical trials and have been shown to produce a reduction in the rate of progression of myopia, or nearsightedness, in the age group where myopia progression typically occurs, i.e., 8 to 18 year-olds. A review paper reports that the rate of reduction is about 45%, on average (Walline J J. Myopia Control: A Review. Eye and Contact Lens (2016). 42:1, 3-8.) The characteristic of these lenses responsible for the myopia reduction effect is thought to be myopic defocus in the periphery. That is, these lenses have a "center/surround" design: the center of the lens corrects the eye fully for distance vision, while the surrounding region under-corrects myopia by shifting the power in the "plus" direction, usually by about 2 diopters. For example, for a −3.00 diopter myopic eye, the center region would have the full power of −3.00 diopters. The annular surrounding region would have a power of approximately 1.00 diopter. That annular region represents "myopic defocus" in eccentric regions of the visual field. While the image at the center of the retina, i.e., at the fovea, is in focus, the image of the surrounding area is somewhat out of focus due to the under-correction of myopia. Animal and human studies provide evidence that this myopic defocus in the periphery presents a "stop signal" to the eye to stop growing in length, and that shorter eye length can result in a less myopic eye.

The potential deficit of these existing lenses, or loss of opportunity for these lenses, is that in the annular surrounding region, the optical power of that region can be highly astigmatic, and astigmatism can prevent the formation of a clearly focused image. Because one meridian, i.e., the radial meridian, does present myopic defocus to the eye, but the perpendicular meridian does not have the same change in power, it can present little or no myopic defocus. Essentially, the strength of the stop signal can be unduly diminished because the two principal meridians do not present the full amount of myopic defocus. Here, each of the plurality of distinct facet surfaces 106 of the exemplary myopia control ophthalmic device 100 has a varying power in both (i) a first direction 108a radially extending from a center location of the center region to a perimeter of the ophthalmic device and (ii) a second direction 108b perpendicular to the first direction 108a to provide a greater degree of myopic defocus.

Example Faceted Lens

FIGS. 2A, 2B, 3A, 3B, and 3C show example facets lens configuration of the myopia control contact lens of FIG. 1 in accordance with an illustrative embodiment. In FIG. 2A, the surface profile of the myopia control ophthalmic device 100 (shown as 100b) includes a central optical zone 102 (shown in FIG. 2B as 102a) for foveal viewing, and an annual region 106 (shown as 106a) configured with a plurality of uniformly sized and uniformly spaced spherical facets. In the example shown in FIG. 2B, the central optical zone 102a has a diameter of 4 mm, which corresponds to the pre-defined power for that area. The facets 106a in the annual region have a spherical contour having a center shown at radial position 202, which is about 3.5 mm radius 208 from the lens center 204. In the example shown in FIG. 2B, the facets have a height profile 218 of about −16 μm to +4 μm (see scale 210) relative to a baseline curvature (220) of the lens which can be between 9 and 10 mm, e.g., 9.5 mm, in most embodiments. It can be observed per the various contours of the facets that the prominent portion (shown as 212) of the facets has a similar height or power to that of the center optical zone 102a. The facet contours The facet portion 212 also has the facet contour center 206. As shown per the scale 210 and iso-contour lines, the height of the facet contours is more relatively stable near the prominent portion as compared to the periphery, which changes more quickly. The cross-sectional diagram 224 is not drawn to scale.

The lens can have a 0.5 mm to 1 mm baseline thickness (222) in most embodiments, though other sizes and dimensions may be employed for the specific patient. Indeed, the example dimensions, and the number of facets, are merely illustrative and can be varied based on pupil sizes and other ocular dimensions, e.g., according to the ratios or dimensions described herein.

Figure 2B:
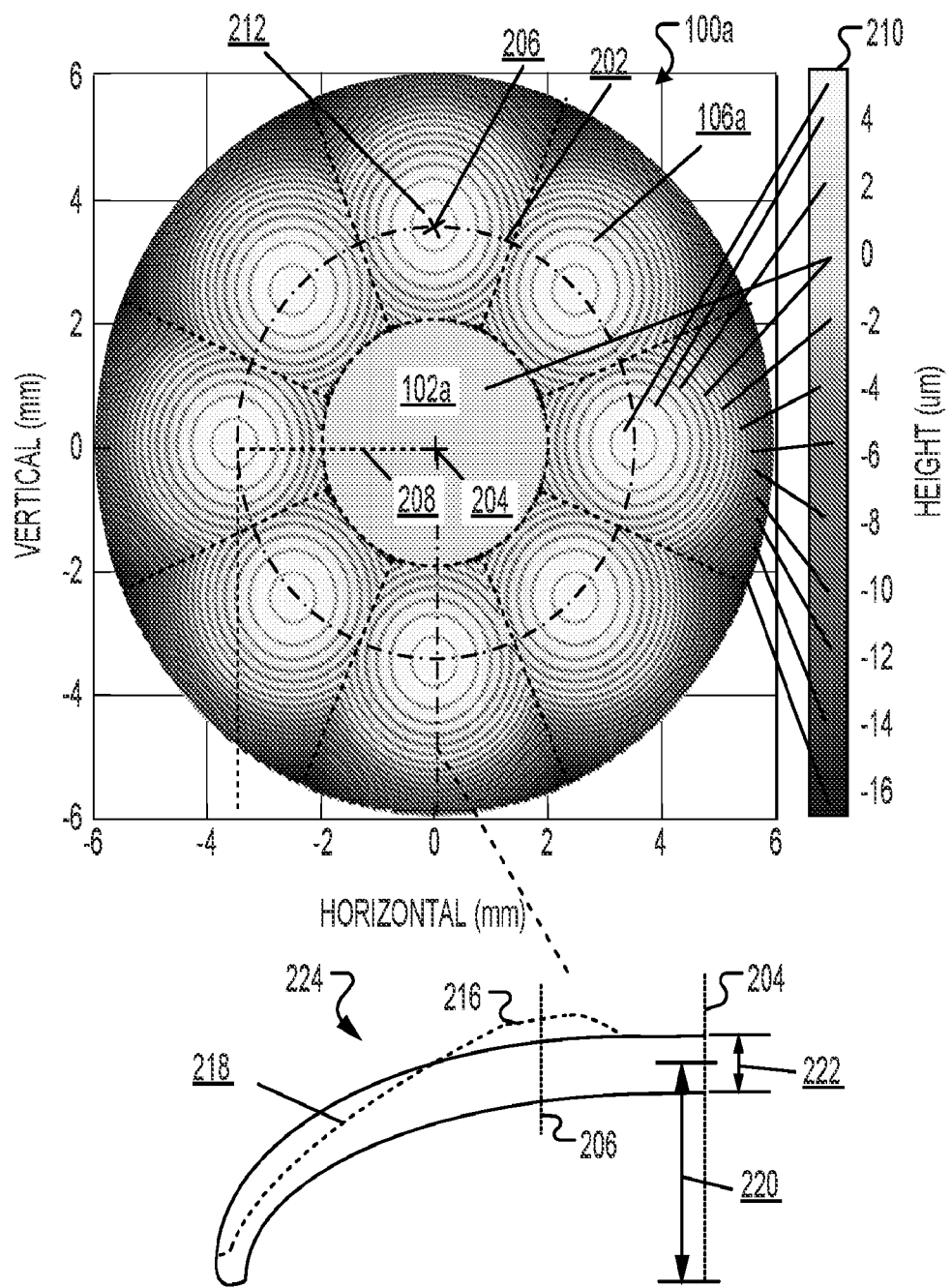

The example shown in FIG. 2A, 2B, there are 8 facets. The example shown in FIG. 3A, 3B, there are 6 facets. In other embodiments, 4-16 facets (e.g., 106, 106a), or more, may be implemented. The central or peak regions of the contour center of the facets (e.g., 106, 106a) may be located at the same radial position as shown and described in relation to FIGS. 2A, 2B, 3A, 3B. In other embodiments, the central or peak regions of the contour center of the facets (e.g., 106) may be located at different radial positions (not shown). In yet other embodiments, the lens design can include a second set of facets located at a second radial position and that are located between the facets at the first radial position (see FIG. 6B). The variations can be employed as different design embodiments or, in some embodiments, employed to create an intended aberration.

Figure 3B:
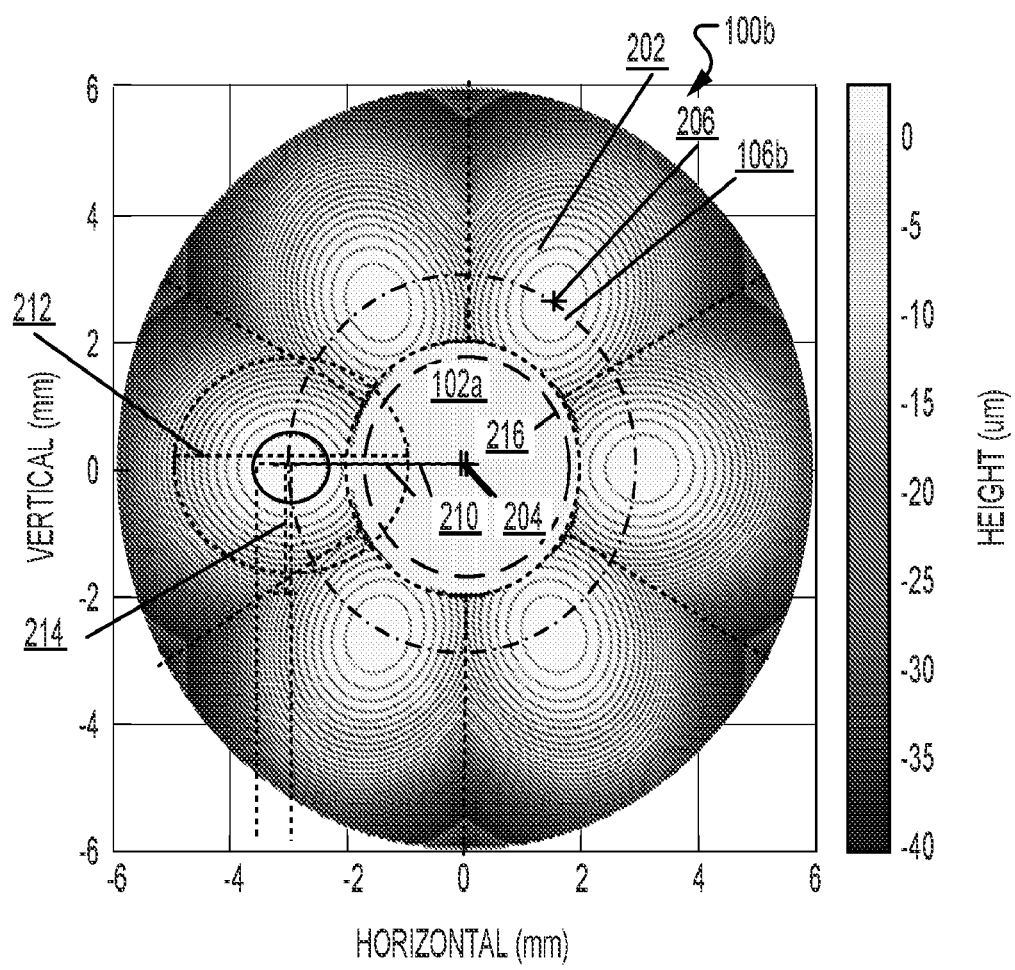

FIGS. 3A and 3B show the surface profiles of another faceted lens design comprising 6 segmented spherical contoured facets 106b. In FIG. 3B, the surface profile of the myopia control ophthalmic device 100b includes the central optical zone 102a for foveal viewing and an annual region 106b configured with a six uniformly sized and uniformly spaced facets. In the example shown in FIG. 3B, the central optical zone (for foveal viewing) is also 4 mm in diameter. The surrounding facets have height contours that are oval in shape due to the facets having different curvatures in the radial and perpendicular meridians.

The example shown in FIGS. 3A and 3B, there are 6 facets. In other embodiments, 4-16 or more facets may be implemented. These facets may be located at the same radial position as shown in FIGS. 3A and 3B. In other embodiments, the facets may be located at different radial positions.

Similar to FIGS. 2A and 2B, the faceted lens design of FIGS. 3A and 3B are configured to produce a stop signal to eye growth. The contours in FIGS. 3A and 3B are oval because the surface shape of each facet is toric, or spherocylindrical. The sphero-cylindrical shape can produce myopic defocus and correct increasing astigmatism typical of most eyes in the periphery. Each of the faceted lens design 106 has a varying power in both (i) a first direction radially extending from the center location of the center region to a perimeter of the ophthalmic device and (ii) a second direction perpendicular to the first direction. In so doing, the full or greater strength of the myopic defocus is maintained in all meridians. The dimensions, and the number of facets, are variable, but these properties are probably reasonable values given typical pupil sizes and other ocular dimensions. In the example shown in FIG. 3B, the dimensions are shown for a design intended for a pupil having 3.5 mm in diameter (shown as 216), about 15% larger than the pre-defined pupil size. It is noted that the pupil can vary by about 20% in size due to a change in illuminance.

Figure 3C:
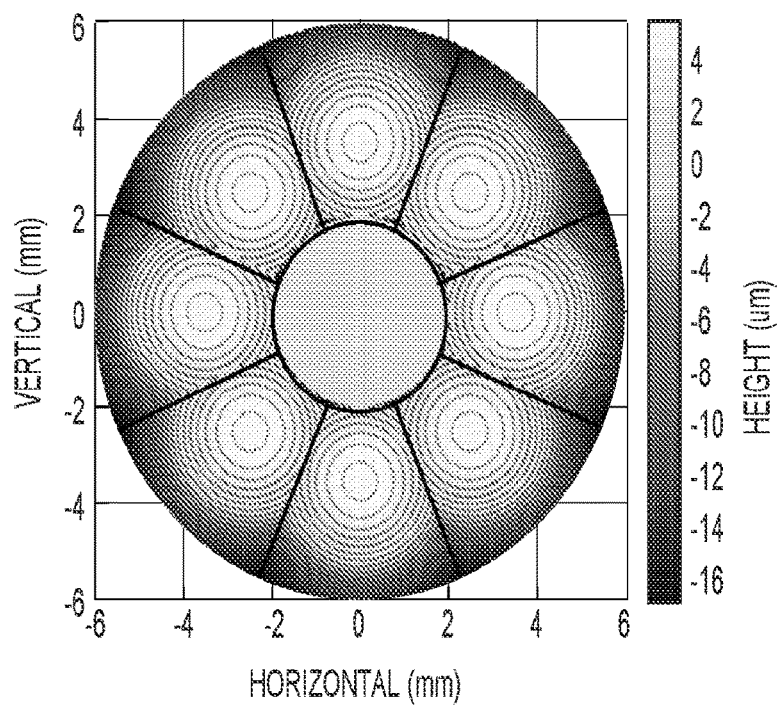
Figure 3C:
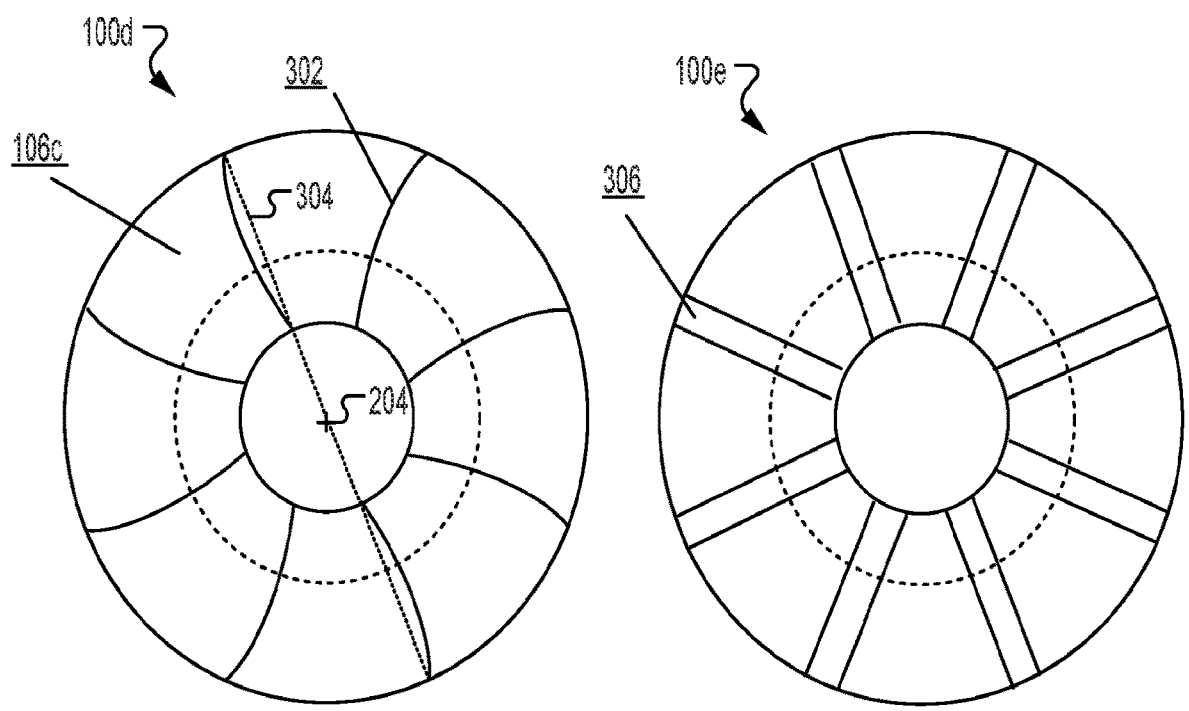

FIG. 3C shows alternative configurations of the segment boundaries of the facets. In FIG. 3C, the myopia control contact lens 100d has facets 106 (shown as 106c) in which the facet or segment boundaries 302 are not straight or parallel to the radial line 304 intersecting the center 204 of the lens.

FIG. 3C also shows an alternative configuration of the myopia control contact lens 100e having facet or segment boundaries 306 having a pre-defined radial width. The facet or segment boundaries 306 may provide an alternative configuration, e.g., for manufacturability.

Figure 5:
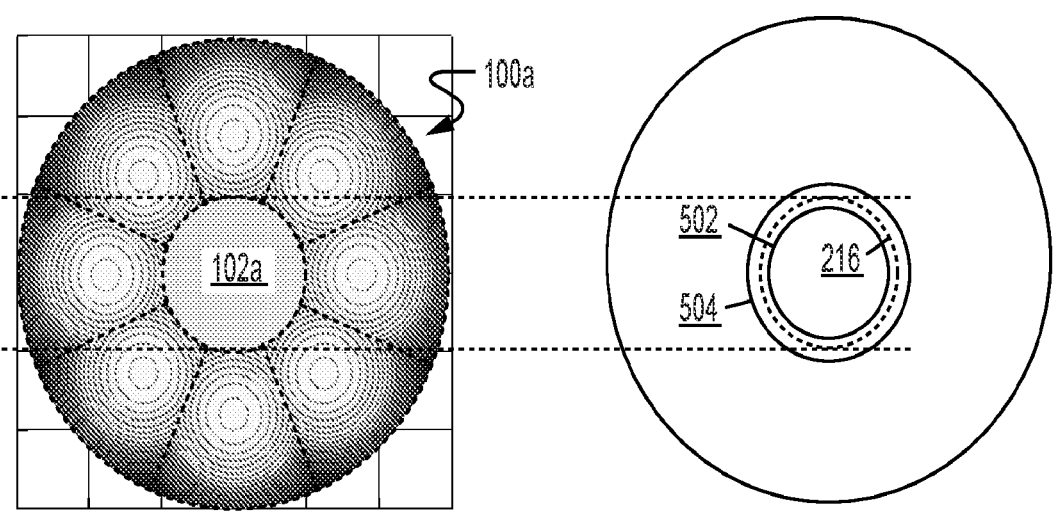
FIG. 5 shows an example dimensioning of the myopia control ophthalmic device in relation to the pupil in accordance with an illustrative embodiment.

FIG. 5 shows an example dimensioning of the myopia control ophthalmic device 100 in relation to the pupil. In FIG. 5A, the center region 102a, as defined by a pre-defined power is shown relative to a pre-defined pupil size 216. FIG. 5A shows example variability of the pupil size in relation to the pre-defined pupil size 216, including an example minimum pupil size 502 and maximum pupil size 504. It can be observed that the center region 102a are substantially sized features similar to the pupil size of the patient to provide corrective power to the fovea. In some embodiments, the center region can be specified to be within about 80% to 120% of the pre-defined pupil size. Alternatively, the center region can be specified to be within 80% to 110% of the maximum pre-defined pupil size. The diameter of the facets and central portion of the myopia control ophthalmic device may be limited to about 10 mm, e.g., to encircle the region important for image formation across the visual field. The actual contact lens would be larger, e.g., up to 16 mm in diameter.

It can also be observed that the annular regions and the corresponding facets located thereat are substantially sized features, as described herein, in relation to the eye's anatomy to provide myopia defocus corrective power. The smaller facet sizes having diameters, e.g., 1 mm-2 mm, or less, may produce lessened myopia defocusing effects due to pinhole effects associated with their size.

Figure 4:
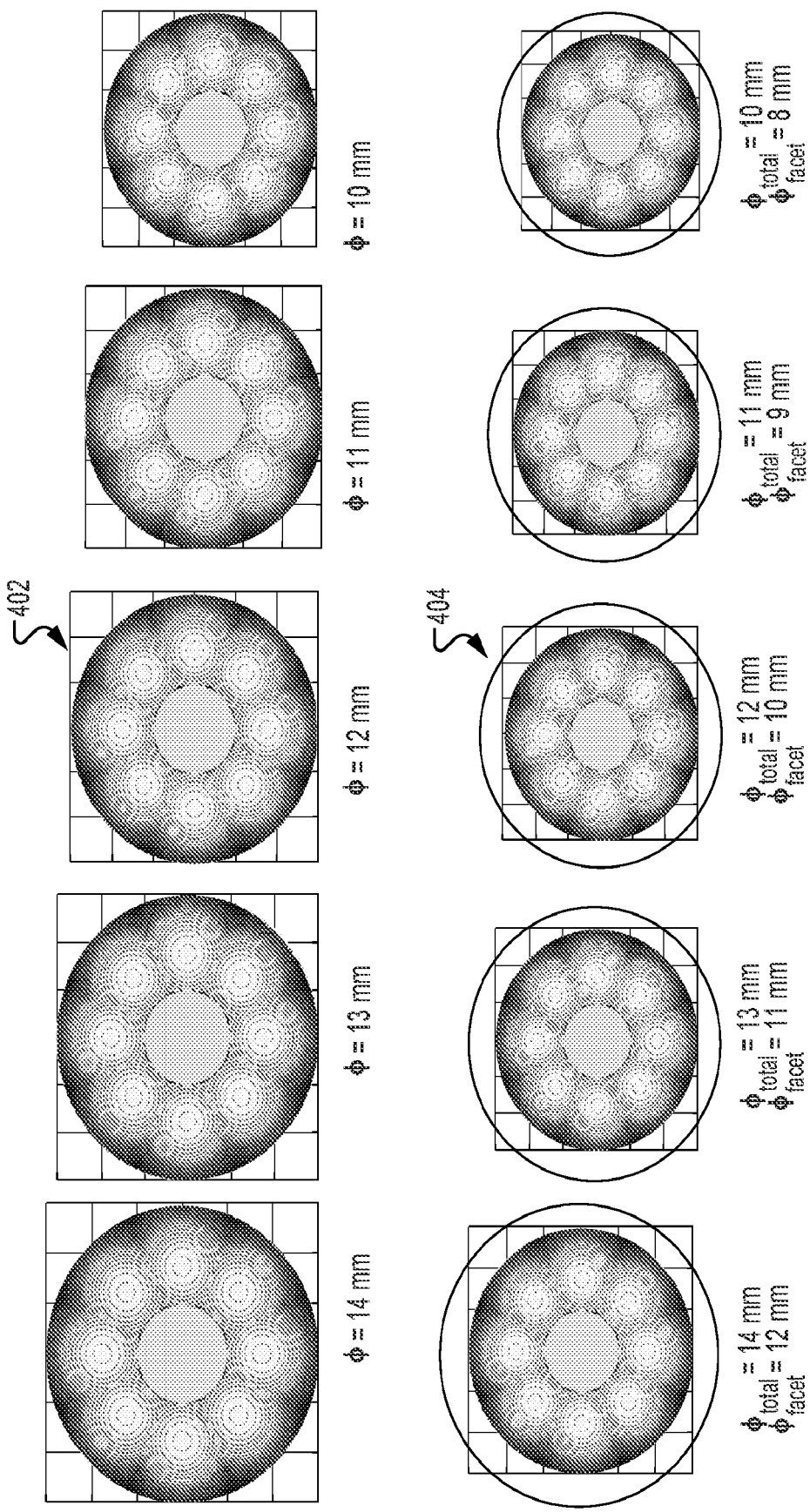
FIG. 4 shows example sizes of the myopia control ophthalmic device of FIG. 2A in accordance with an illustrative embodiment.

As noted above, the exemplary myopia control ophthalmic device 100 can be prescribed to children based on the patient's current eye size. The same condition is true when prescribing the device to adults. FIG. 4 shows example sizes of the myopia control ophthalmic device 100 of FIG. 2A in accordance with an illustrative embodiment. As shown in FIG. 4, the myopia control ophthalmic device 100 (shown as 402) includes facets that are sized to extend to the edge of the contact lens. The lens size in this example is shown to vary between about 10 mm and 14 mm. In some embodiments, the size can be smaller than 10 mm. In some embodiments, the size can be larger than 14 mm, as described herein. Also shown in FIG. 4, the myopia control ophthalmic device 100 (shown as 404) includes facets that are sized to extend to a pre-defined radial position of the contact lens. In the example shown in FIG. 4, the devices 404 are shown to have to have same overall dimensions as devices 402, but the facets are sized to be 2 mm less than that overall dimension. It should be appreciated that any of the myopia control ophthalmic devices described herein can be configured to extend to the edge of the contact lens per 402 or to a pre-defined radial position per 404.

Example Configurations of the Myopia Control Ophthalmic Device

Figure 6A:
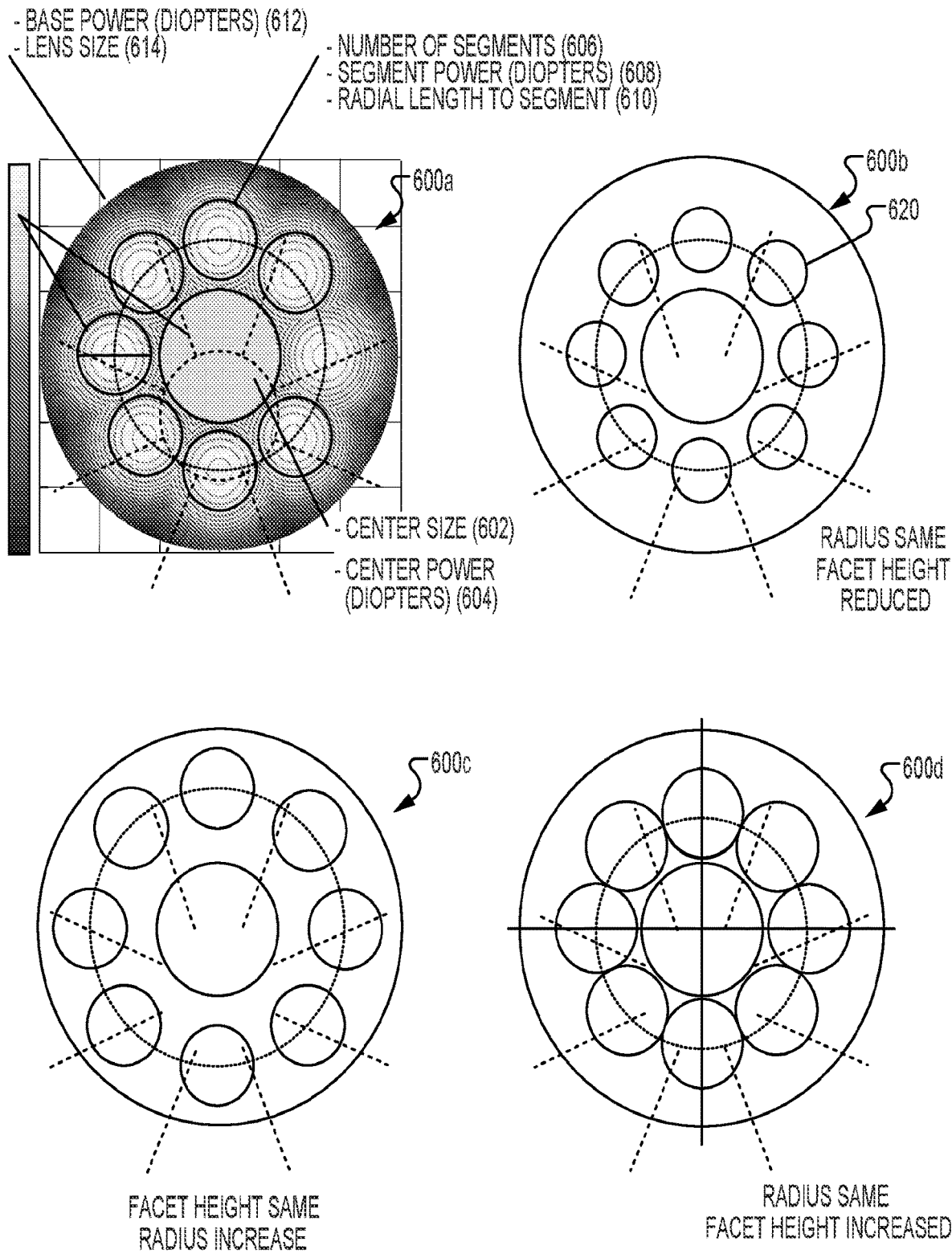
FIGS. 6A, 6B, 6C, 6D, and 6E illustrate example configurations of the exemplary myopia control ophthalmic device in accordance with an illustrative embodiment.

FIGS. 6A, 6B, 6C, 6D, and 6E illustrate example configurations of the exemplary myopia control ophthalmic device 100 in accordance with an illustrative embodiment. In FIG. 6A, the myopia control ophthalmic device 100 (shown as 600a) of FIG. 2A is shown as defined by a center diameter parameter (also referred to as optical zone diameter, center (mm) "Center Oz" parameter 602) and associated power 604 (varying the height), number of facet segments (also referred to as "#Segs" 606) and associated power 608 (varying the height), a radial length between the center of the facet segments and the device center (also referred to as distance to the optical center of the segments "OC Dist" 610), the base power of the lens (612), lens size (mm) (614).

In one example, the myopia control ophthalmic device 100 (shown as 600b) is shown configured with the same radial length parameter as that of device 600a but with the facet size reduced. In the diagram, the contours 620 of the facet has about the same height as the center region.

In another example, the myopia control ophthalmic device 100 (shown as 600c) is shown configured with facets having a facet contour that has a larger radial length parameter as compared to that of device 600a. In the diagram, the contours of the facet have about the same height as the center region.

In another example, the myopia control ophthalmic device 100 (shown as 600d) is shown configured with facets having a facet contour that has the same radial length parameter as that of device 600a but with higher facet contours. In the diagram, the contours of the facet have about the same height as the center region.

Figure 6B:
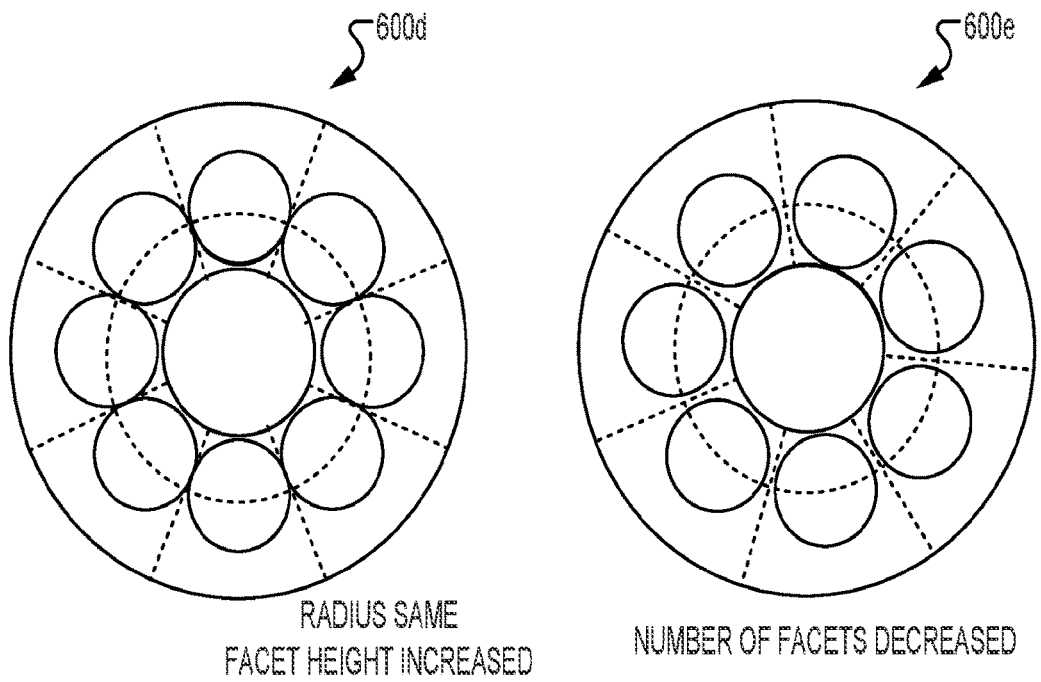

In FIG. 6B, the myopia control ophthalmic device 100 (shown as 600e) is shown configured with the same radial length parameter and facet height as that of device 600d, but the number of facets is decreased from "8" to "7." In the diagram, the contours of the facet have the same height as the center region.

Figure 6C:
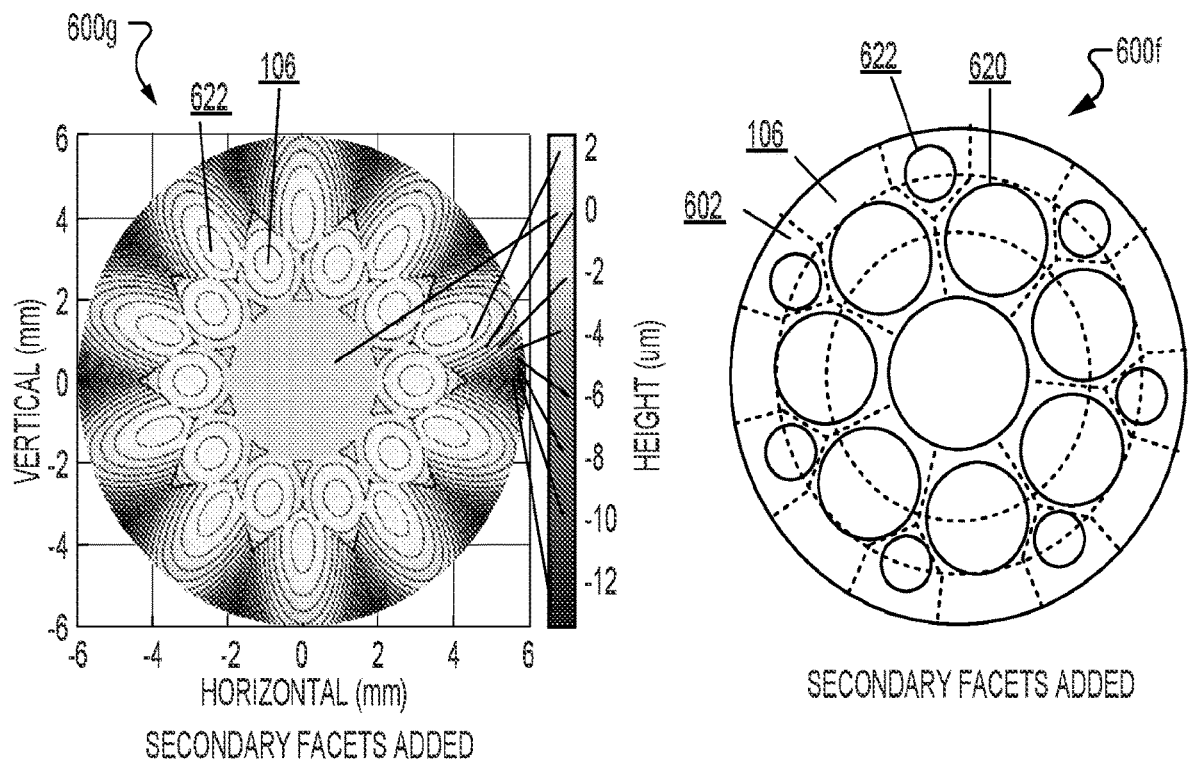

In FIG. 6C, the myopia control ophthalmic device 600a is shown (via device 600f) configured with a set of primary facet segments (e.g., 106) and secondary facet segment 622. Each of the primary facet segments and the secondary facet 622 has a separate peak shown via contours 620 and 624. In the diagram, the contours 620 of the primary facet 106 is about the same height as that of the center region; however, the heights of contours 620 and 622 do not have to be the same. FIG. 6C shows a second myopia control ophthalmic device 600g also configured with the primary facet segments (e.g., 106) and the secondary facet segments 622. Here, the second facet segments 622 each has a larger area than the first facet segment 106.

Figure 6D:
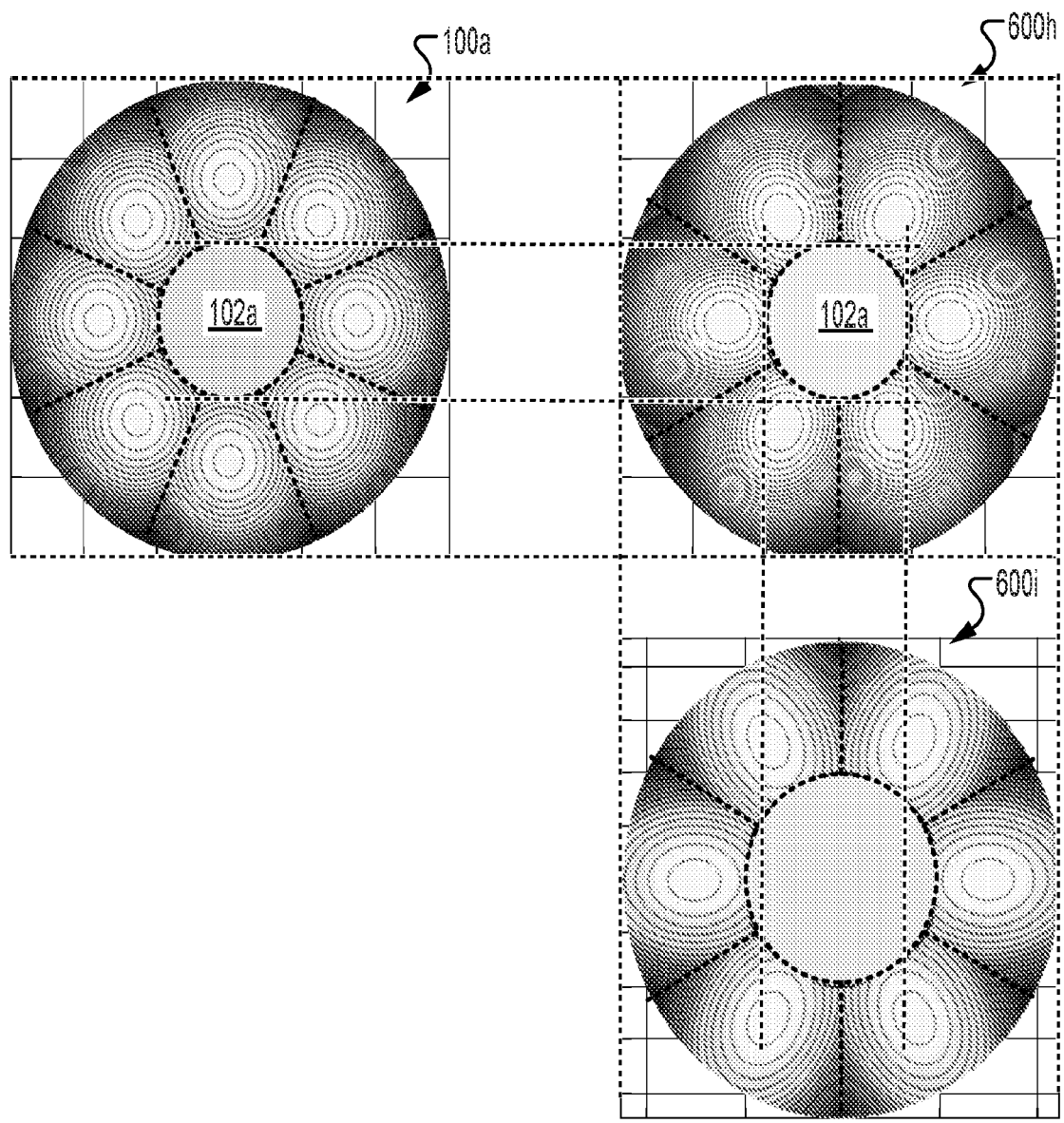

In FIG. 6D, the myopia control ophthalmic device 600a is shown, via devices 600h and 600i, adjusted to have two different facet contour configurations with 6 symmetrically shaped oval facet contours of different height profiles. That is, the oval facet contours are height contours of the surface, which has different curvatures in the radial and perpendicular meridians.

Figure 6E:
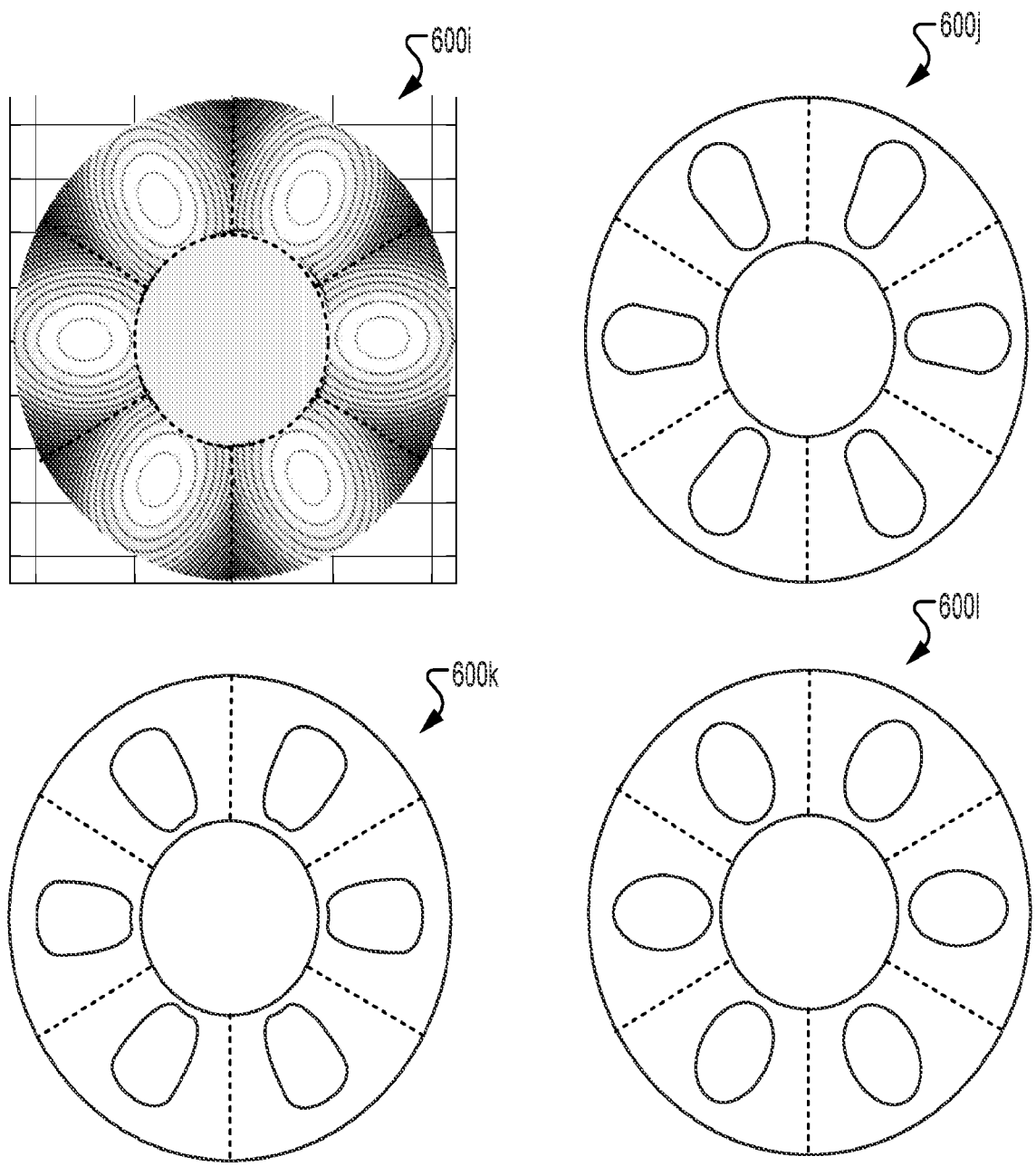

In FIG. 6E, the myopia control ophthalmic device 600a is shown, via devices 600j, 600k, 600l, to have asymmetrically shaped oval facet height contours. Indeed, in addition to symmetrically shaped oval facets, exemplary myopia control ophthalmic device 100 can be parametrically defined to have asymmetrically shaped oval facets. The asymmetrically shaped oval facet height contours (e.g., of device 600j, 600k, 600l) can be used to introduce aberration where desired.

EXPERIMENTAL RESULTS AND EXAMPLES

Figure 9A:
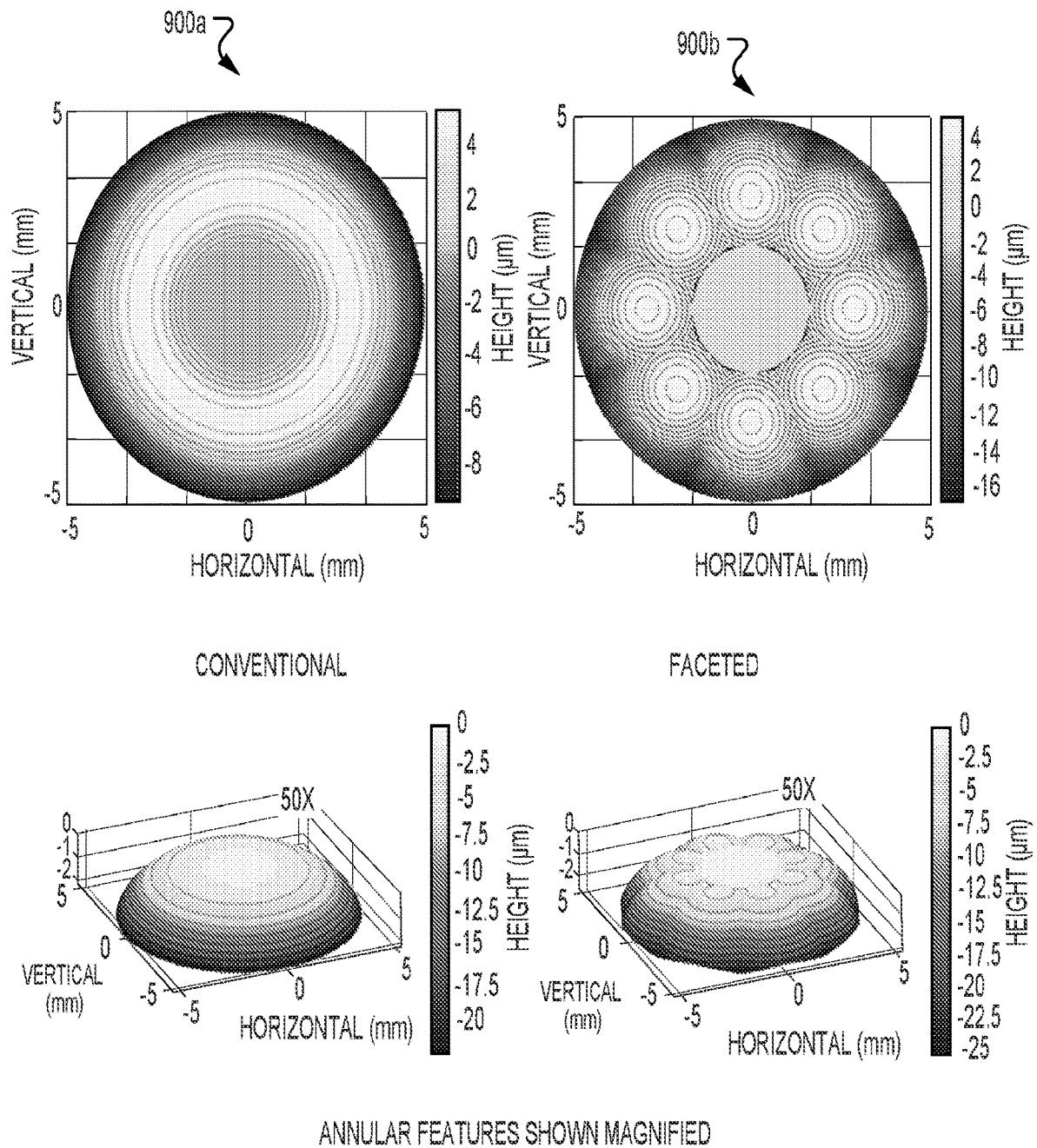
FIGS. 9A and 9B each shows a compared view of a multifocal lens design and a myopia control ophthalmic device in accordance with an illustrative embodiment.
Figure 9B:
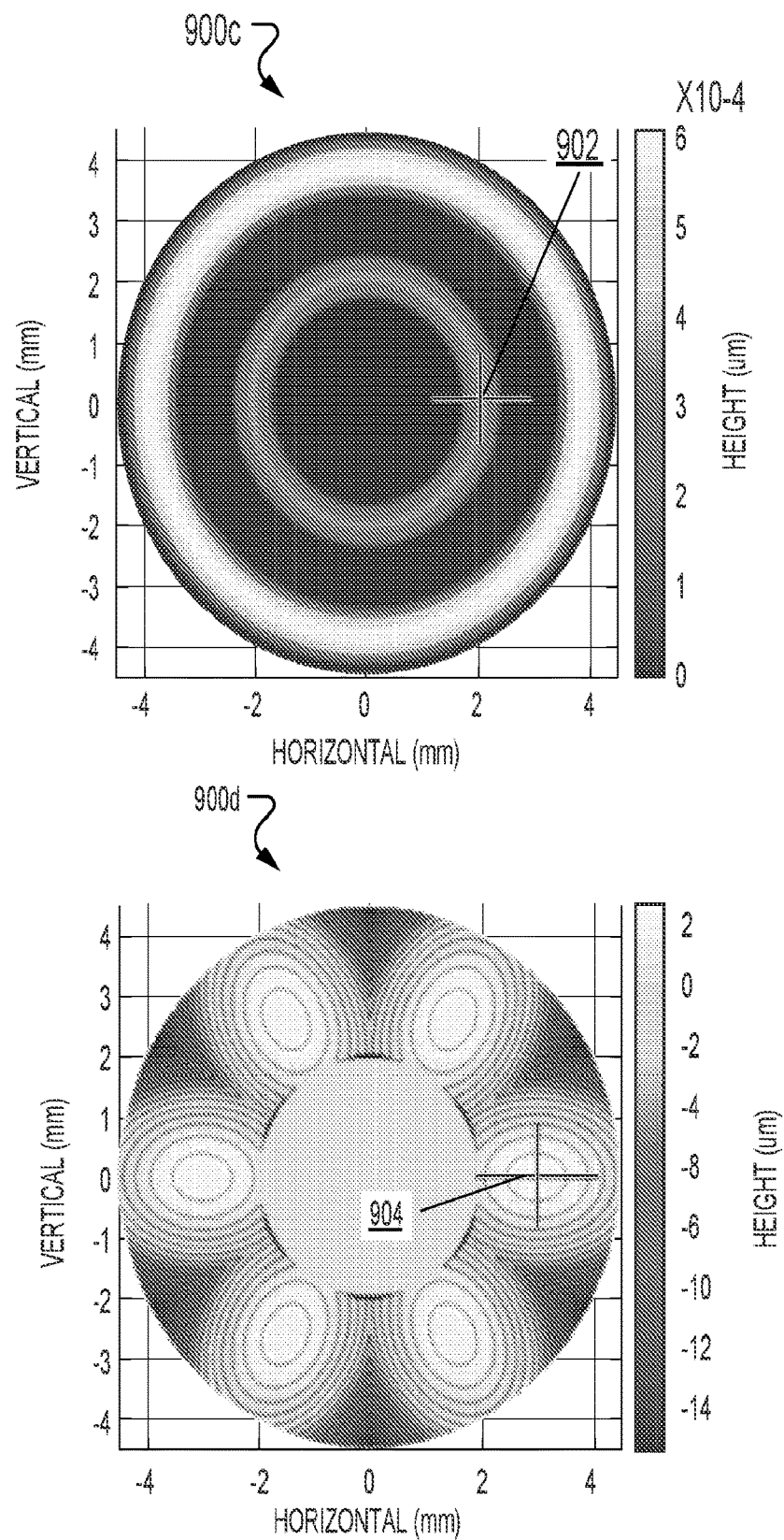
Figure 10A:
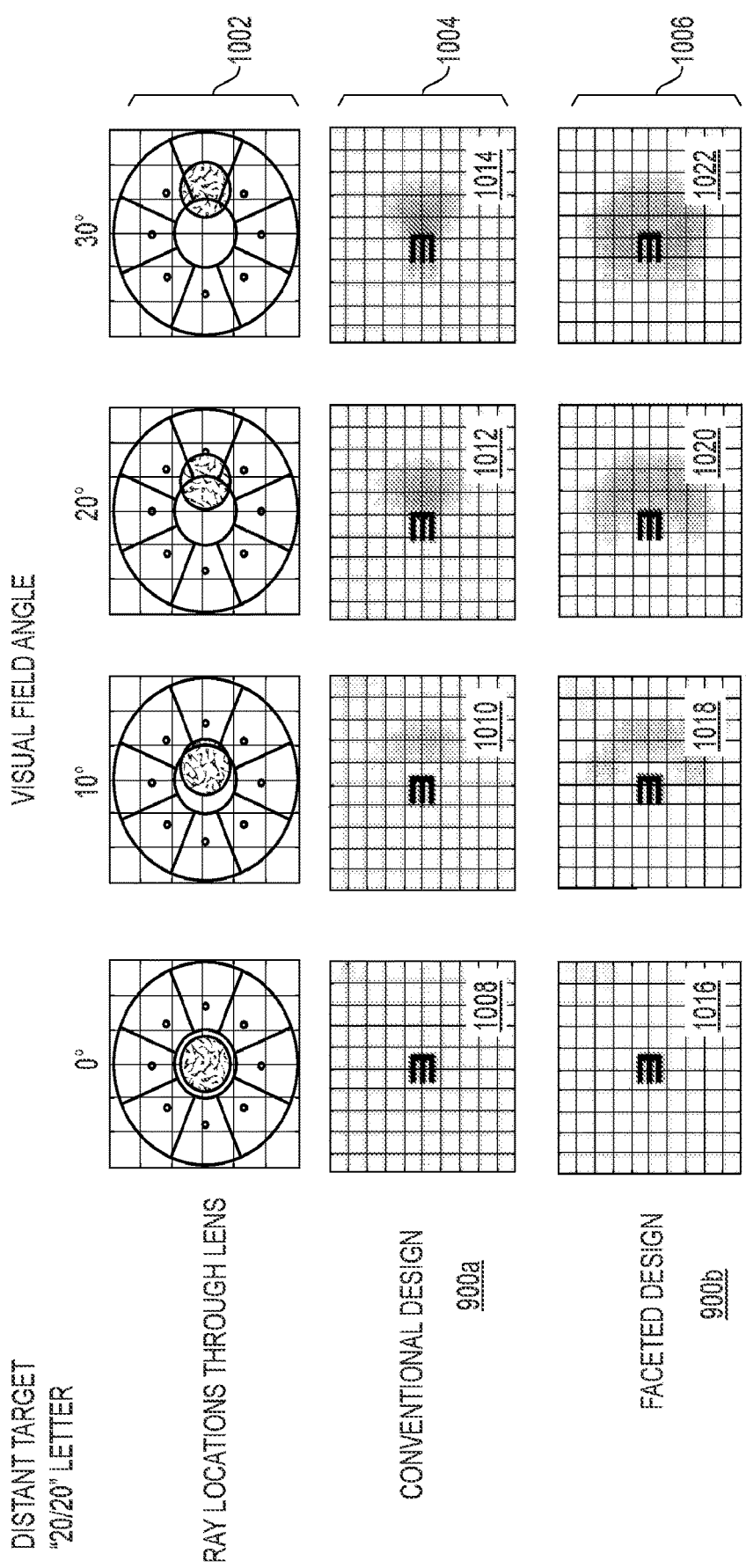
FIGS. 10A and 10B show ray tracing simulation results for the lens of FIG. 9A in accordance with an illustrative embodiment.
Figure 10B:
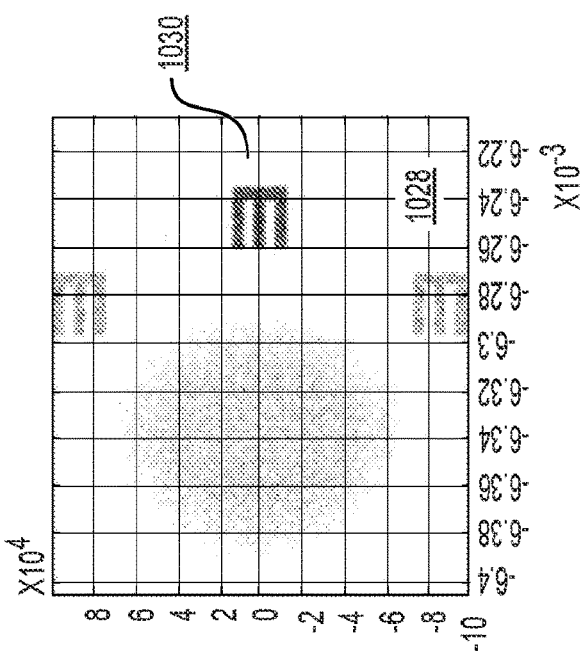
Figure 10B:
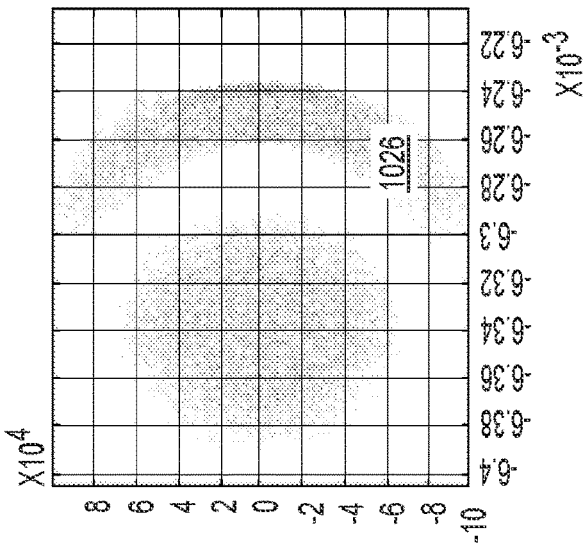
Figure 10B:
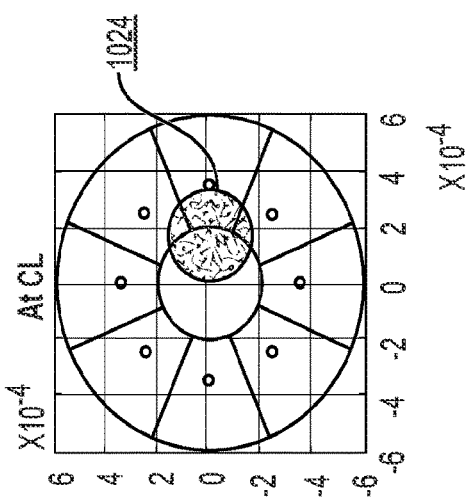

A study was conducted to evaluate via simulations the myopia control ophthalmic device 100. The study evaluated the myopia control ophthalmic device 100, e.g., as shown in FIGS. 2A and 3A in relation to another multifocal lens design as described in Walline J J. [6]. FIG. 9A shows a perspective view 900a, 900b of each of the two designs. FIGS. 10A and 10B show ray tracing simulation results for the lens of FIG. 9A. FIG. 9B shows another multifocal lens design 900c and another myopia control ophthalmic device 900d. FIGS. 12A-12E show ray tracing simulation results for the lens of FIG. 9B.

Simulation Methodology: A custom application was developed, via Matlab, to generate a multifocal lens design and a myopia control ophthalmic device (e.g., 100) for a set of parameters. The custom application was configured to receive parameters, via a Matlab graphical user interface, for a three-dimensional profile of a myopia control ophthalmic device 100 and to perform ray tracing associated analysis to output image characteristics under different viewing conditions that can be used to evaluate the myopia defocus performance of the different lens configuration. Other ray-tracing software and analysis, including CODE V (manufactured by Synosys) and OpenStudio (manufactured by Zemax) may be used to evaluate or generate the myopia control ophthalmic device.

The Matlab simulations were carried out through a series of steps, including (i) the creation and initialization of variables needed in subsequent calculations, (ii) generation of the lens surfaces, (iii) execution of ray tracing analysis, and (iv) generation of plots of the retinal images. The contact lenses are placed on a model eye consisting of four surfaces: a corneal surface, a crystalline lens with front and back surfaces, and a retina.

Lens Parameters and Variables (808). FIG. 7 shows an example of the graphical user interface 700 employed in the study that receives a set of lens parameters and ray-tracing analysis parameters. The interface may include the parameters (e.g., 602, 604, 606, 608, 610, 612, 614) described in relation to FIG. 6A. In the example shown in FIG. 7A, The interface 700 included parameters for a myopia control ophthalmic device (e.g., 100a) with uniformly sized and uniformly spaced spherical facets (e.g., 106) as well as parameters for the ray tracing evaluation.

The list of lens parameters is summarized in Table 1, and the list of ray tracing evaluations is summarized in Table 2.

TABLE 1

| Variable | Description | Unit |
|---|---|---|
| Center OZ | Center Optical Zone | Diameter (mm) |
| # of Segs | Number of facet segments | |
| Seg Add | Added power to the facet segment regions | Diopters (D) |
| OC Dist | Distance between the optical zone center and the optical center of the facet segments | Distance (mm) |
| Lens size | Lens size | Diameter (mm) |
| Astig Design | Eccentricity Astigmatism Correction Angle | Degrees |
| Base curve of the lens | Baseline curvature for the lens | Height (mm) (default: 9.5 mm) |
| Base thickness of the lens | Baseline thickness of the lens | Thickness (mm) |

TABLE 2

| Variable | Description | Unit |
|---|---|---|
| Pupil Size | Model pupil size | Diameter (mm) |
| VF Angle | Visual field angle or eccentricity | Degrees |
| # of Rays | Number of rays employed in the ray tracing analysis | Unitless |
| Lens Rot | Rotation of lens with reference to ray tracing source | Degrees |
| Segs Only | Display the image formed by the segments (facets) only | |
| Include HOA | Display includes the typical aberration results in the formation of the retinal image | |
| Include Scatter | Display includes the scatter simulation results of a subset of the rays in the image formation | |
| Target Type | Model target (letter "E", plus "+", Dot ".", vertical bar, horizontal bar, star "*", letter "L") | |
| Dist Power | Simulation parameter for the correction distance vision | Diopters (D) |
| Ring Add | Added power to the concentric ring for the second based lens model | Diopters (D) |
| Azimuth | Radial meridian of the target (i.e., the angle relative to the horizontal position of the target) | Meridian (Degrees) |

Figure 8:
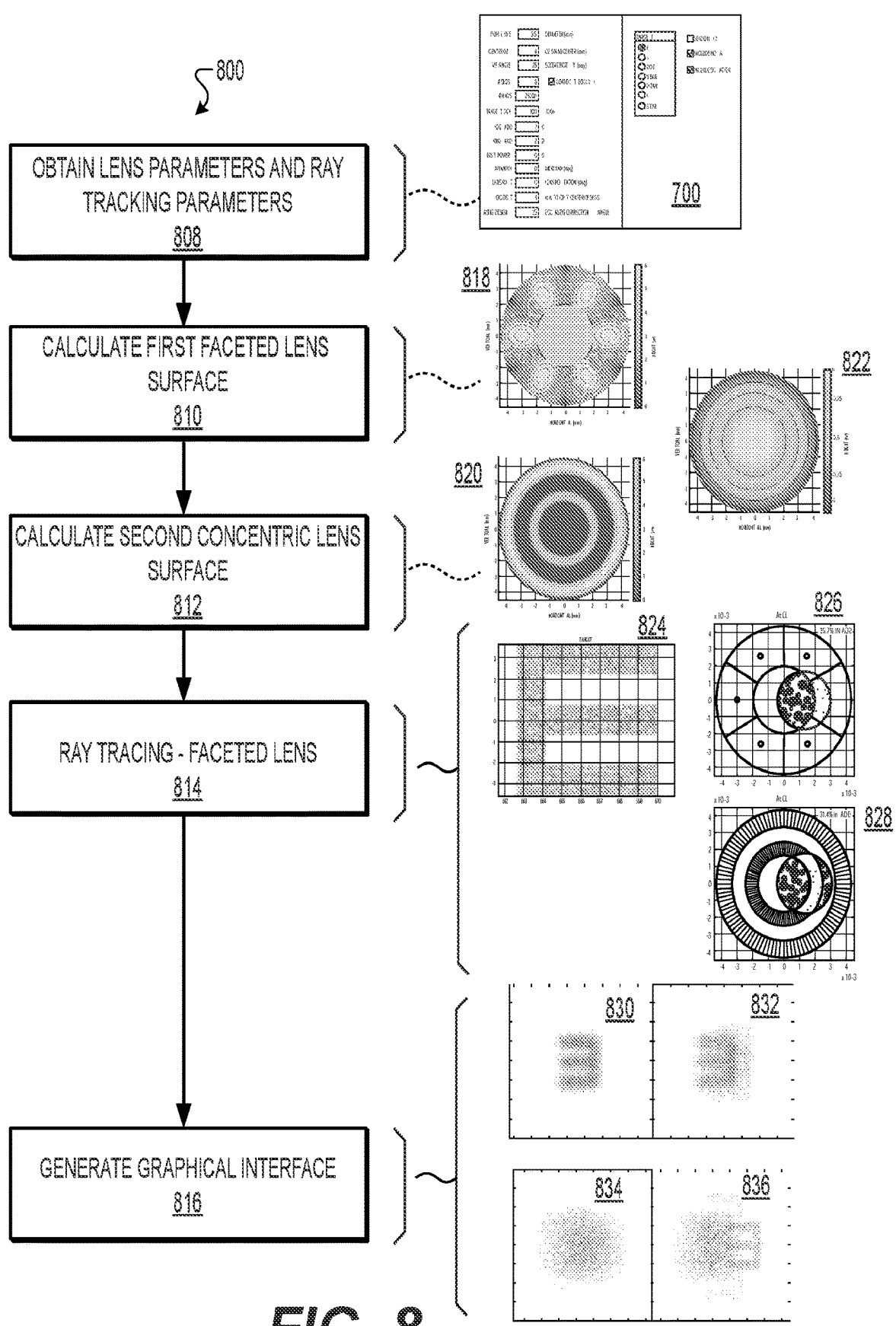
FIG. 8 shows a process to generate and evaluate a myopia control ophthalmic device in accordance with an illustrative embodiment.

FIG. 8 shows a process 800 to generate and evaluate a myopia control ophthalmic device in accordance with an illustrative embodiment. In the study, the simulation first obtained 808 the feature parameters from a GUI (e.g., 700).

Lens Surface Generation (810, 812). The Matlab simulation used in the study was configured to generate the lens surface for the myopia control ophthalmic device (e.g., 100) for a given diameter configured to provide correction for a pre-defined distance vision per the "Dist Power" parameter. The simulation first generates a 2D lens profile. The facets and central optical zone added height profile z was first established for a set of (x,y) positions as a matrix [x, y, z] ("Z matrix") of size [200, 200, 1] and [250, 250, 1]. The matrix size 200×200 and 250×250 were found to be sufficient for the simulation; however, higher resolution should be used when manufacturing the lens.

The simulation then segments/divides the 2D lens surface into the number of segments per the "#of Segs" parameter and defines the additional power for the spaced spherical facets per the "Seg Add" parameter. The simulation defines the optical center of each of those segments based on the "OC Dist" parameter.

The Matlab simulation then created a 3D convex lens by wrapping the facets and central optical zone added height profile z, via the Z-matrix, to a cornea model using pre-defined Matlab functions—see panel 818. The wrapping was performed by taking the lens thickness, including azimuth, radial distance, and elevation, which was initially specified in spherical coordinates, and transforming the lens thickness from the spherical coordinates to cartesian coordinates via a plotting operation. For the simulation, the Matlab contour operator was used to create a 3-D contour plot containing the isolines of the "Z matrix." The baseline curvature for the lens was established based on a pre-defined index of refraction value for the lens material. The simulation employed the back surface for the ray tracing evaluation. The front surface of the 3D convex lens includes additional convex shapes that extend from the base convex.

The elliptical shape of the seg height contours was a result of the two principal meridians of the seg having different curvatures. This toric shape, and thus the elliptical contours, were used to correct peripheral astigmatism of the eye at a visual field angle defined by the "Astig Design" parameter. Peripheral astigmatism is a characteristic of the eye as an optical system.

To provide for the comparative analysis, the simulation also generated a second lens surface for a MiSight contact lens. The contact lens employed the same global parameters as the myopia control ophthalmic device, including the same optic zone diameter and base curve. The simulation added two concentric rings of added power per the "Ring Add" parameter.

Ray Tracing Analysis (814, 816). The simulation employed a contact lens model that includes a corneal surface, a front crystalline surface, a back crystalline surface, and a retina surface. The ray-tracing analysis (814) was initialized at a location outside the corneal surface, and a set of rays corresponding to the "#of Rays parameters" were sent through a target model defined by the "Target Type" parameter.

Each ray originated at the distant target and traversed the distance from the target to the eye, and refracted at the contact lens surface, then the contact lens/corneal interface. It traversed the distance from the cornea to the pupil, passed through the pupil, and then refracted at the front surface of the crystalline lens, traverses the lens thickness, and refracts at the back surface of the crystalline lens of the eye. Each ray was then translated to the retina, and the positions that the rays intersect the retina collectively formed the retinal image. Individual rays were traced until the predetermined number of rays was accumulated. The default target letter "E" (shown as 824) includes 25,000 randomly positioned points. Each point represented the starting point for one ray, which undergoes a series of translations and refractions to ultimately fall on the retina.

To perform the tracing, each ray at each surface was represented by four numbers arranged in a 4×1 array. The first two elements of this array were the horizontal and vertical slopes of the ray, in radians. The second two elements were the horizontal and vertical positions of the ray, in meters. At each surface, the ray was "refracted" by a 4×4 refraction matrix. Each 4×1 ray matrix was matrix multiplied by this refraction matrix, resulting in a new 4×1 array, i.e., the new ray parameters as that ray left that refractive surface. At each surface, the ray directions changed, while the positions remained unchanged. Between surfaces, the ray traversed the intervening space, and the 4×1 ray matrix, as it arrived at the new surface, was found by multiplying the 4×1 ray array by a 4×4 "translation" matrix. With each translation from one surface to the next, the ray positions changed while their slopes remained unchanged. This series of alternating translations and refractions constituted this ray-tracing method.

Panel 826 shows the positions on the contact lens through which the 25,000 rays passed and which passed through the aperture stop, i.e., the pupil of the eye. In this particular example, a peripheral visual angle of 25° was used. The six peripheral segments represented the boundaries of the six add segments used in this example.

The same ray tracing procedures were performed on the second concentric ring design (shown via panel 828).

The simulation then outputted (816) the generated image from the ray-tracing analysis. Panels 830, 832 show the set rays that traverse the pupil of the eye as they arrive at the contact lens surface. The hatched regions of the lens indicate the concentric ring regions of add power. In panels 830, 832, the black dots are those passing through the "distance" power regions of the contact lens. The blue dots are those rays passing through the "add" portions of each lens.

In the example shown in FIG. 8, the two images 830, 832 are for the letter "E," placed 25° in the horizontal peripheral visual field. The left image was produced by the concentric ring design; the right image by the faceted design. The images composed of black dots are those formed by the distant vision portions of the contact lens. The blue dots are the image formed by the "add" portion of the contact lens. The black images are nearly identical since they are both formed by the distance portion of each lens. Both are also blurred because the peripheral astigmatism of the eye is not corrected in the distant focus regions of each lens. The images formed by blue dots differ because the focusing properties of the add regions of the two lenses are quite different. The image composed of blue dots in the right image is more dispersed, i.e., more blurred, because the added segments of the faceted lens have the full add power in all meridians of the segs. The concentric ring lens on the left has added power in the radial meridian of the ring but not in the perpendicular meridian, resulting in an image that is less blurred. In essence, this concentric ring lens produces less myopic defocus than the faceted lens.

The conditions producing the images in panels 830, 832 and panels 834, 836 differed only in vitreous depth. In panels 834, 836, the retina has been moved forward in the eye to coincide with the focal plane for the nominal +2.00 D add power of each lens. The images formed by black dots, i.e., by the distance regions of each lens, are blurred because the retina has been moved forward from the distance-focus plane. The images composed of blue dots are quite different between the left and right images: the faceted design (right) is more clearly focused because those added segments have added power in all meridians, producing a sharper focus in this shorter eye. The image from the concentric lens does not have the full add power in all meridians, and so the image is not focused on all meridians. It was observed that the faceted design creates a sharper distinction between what is in and out of focus. That is, the faceted lens demonstrates a marked transition from out-of-focus images (for a long eye) to more clearly focused images (for a short eye). Consistent with the stop signal hypothesis governing eye growth, the faceted lens produces a stronger stop signal for eye growth.

Myopia Control Ophthalmic Device with Spherical Facets: In FIG. 9A, the overall curvature of the lenses (900a, 900b) is shown for a lens with a base radius of curvature of 9.5 mm. The annular features of each (i.e., the change in power from the center to the surrounding areas) are magnified 50× to show the features in the annular zone as the actual differences are too small to be seen without magnification.

FIGS. 10A and 10B show simulation results, for example, myopia control ophthalmic devices 100. In FIG. 10A, examples of retinal images are shown formed by both lenses 900a and 900b at four different visual-field angles (eccentricity), including 0° (straight ahead), 10°, 20°, and 30° to the side. The top row 1002 shows the entrance point of the rays through the lens that also enters the pupil of the eye. The middle row 1004 shows the retinal images for a conventional design (e.g., device 900a) and the bottom row 1006 for the faceted design (e.g., device 900b).

For each design and eccentricity (1008-1022), it can be observed that the reversed "E" generated by the ray-tracing analysis has the same image quality, likely because the central optical zone is identical for the two lenses. As eccentricity increases (1010-1014; 1018-1022), a greater proportion of the light traverses the lens through the surrounding region. Because the surrounding region (e.g., 104) has a different power, it forms an out-of-focus image (1010-1014; 1018-1022) that has the representation of a 'cloud' of points as compared to the main image (1008, 1016).

It can be observed that the ray-tracing analysis generates cloud patterns that is different between the two lens designs (900a, 900b). FIG. 10B shows a difference between cloud patterns between the lenses 900a, 900b for a 20° visual field angle 1024 and the target placed at 50 cm (corresponding to the +2.00 D "add" power of the surrounding annulus). As seen with the conventional lens evaluation (1026), the target "E" does not come to a clear focus. Because of astigmatism in the annular region, a clear image is not formed for any viewing distance. For the faceted lens, a clear image of the reversed E is shown in the image and is clearly focused because all meridians have the full added power (e.g., +2.00 D add power). Because all meridians have that full power, a much stronger stop signal for eye growth is created. A lens of this design type could be much more effective as a myopia control lens than existing lenses designed.

Myopia Defocus and Eye Growth Discussion: Over the last few decades, numerous animal and human studies have provided evidence that the refractive development of the eye is influenced by the optical correction of the eye [1,2]. It has been observed that correction of an eye with a multifocal contact lens during the period of life of active eye growth can modify the refractive development of that eye [2-5]. A number of hypotheses explaining this observation have been proposed [6]: A leading hypothesis is that the peripheral retina plays a significant role in modulating eye growth. The eye tends to govern its own growth to minimize refractive error, a process called "emmetropization."

Emmetropia is the state of vision in which a faraway object at infinity is in sharp focus with the eye lens in a neutral or relaxed state. That condition of the normal eye is achieved when the refractive power of the cornea and eye lens and the axial length of the eye balance out, which focuses rays exactly on the retina, resulting in perfect vision. Emmetropization is the development of the eye towards emmetropia.

For example, peripheral hyperopic defocus, occurring in an eye that is too short, will promote eye growth, decreasing the hyperopia. Similarly, peripheral myopic defocus—occurring in an eye that is too long (also referred to herein as myopia defocus)—could retard eye growth, slowing the progression of myopia. It has been postulated that, in comparison to the fovea, the peripheral retina has a disproportionate influence on refractive error because it is very much larger in area than the fovea. Despite the peripheral retina having a lower density of photoreceptors and lower visual resolution, the vastly larger peripheral retinal area dominates the emmetropization process of the eye.

Figure 11A:
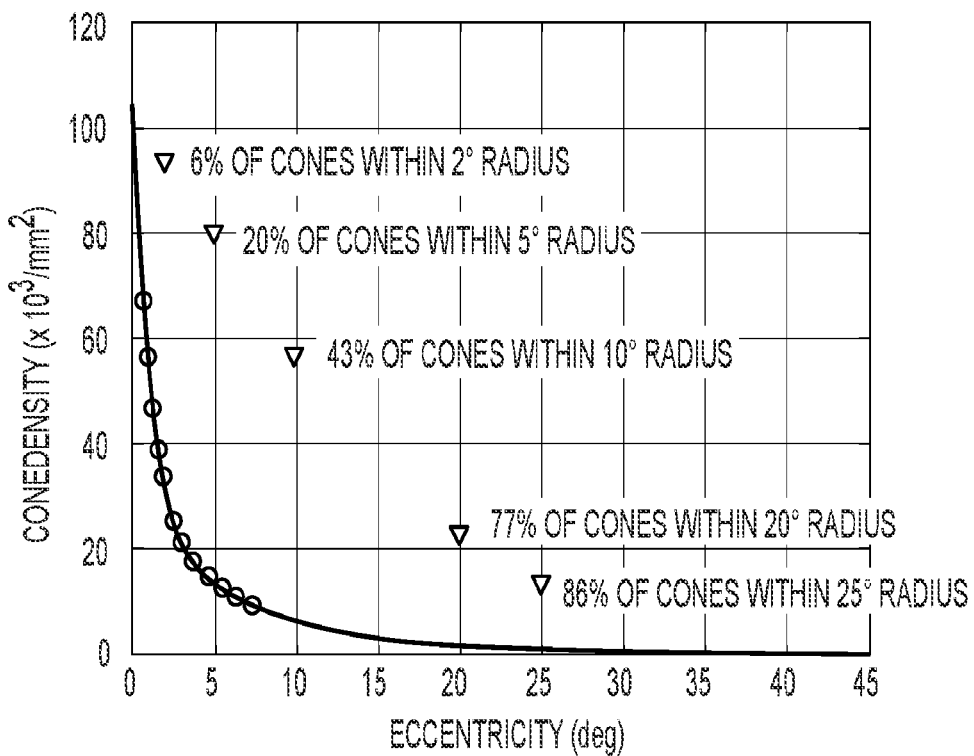
FIGS. 11A 11B, 11C, and 11D show aspects of the modeling of myopia defocus in accordance with an illustrative embodiment.

FIGS. 11A-11D show aspects of the modeling of myopia defocus in accordance with an illustrative embodiment. Specifically, FIG. 11A illustrates cone photoreceptor density as a function of eccentricity [7]. There are approximately 6 million total cones in the averaged human retina, and the peak density at the foveal center is over 100,000 cones/mm². With eccentricity, the cone density drops quickly while the retinal area increases. FIG. 11A also shows the proportion of the total number of cones within several given radii from the fovea. For example, about 57% of all cones are more than 10 degrees from the fovea.

The precise physiological mechanism of the manner that peripheral myopic defocus impedes myopic progression is still a topic of on-going research. However, because the vast majority of cones are outside the fovea, the example myopia control ophthalmic device 100 is configured to promote emmetropization to the effect that it causes light to focus into the eye to the desired distribution of photoreceptors across the retina. There is evidence for rods being involved with emmetropization in mice studies [8], and thus, the example myopia control ophthalmic device 100 can also improve upon myopia control within this underlying scientific assumption. If rods are involved in the process of emmetropization, a similar effect to that of the cone photoreceptor could be generated by the example myopia control ophthalmic device 100, as rods are also absent in the foveal and can reach their highest density at about 20 degrees from the fovea.

This theory of emmetropization has led to the development of refractive correction strategies designed specifically to prevent the progression of myopia. These approaches are designed to deliver peripheral myopic defocus, to be used in children during the phase of ocular growth in which myopia typically develops. While some of those corrections involve spectacle lens designs [9], most approaches are contact lens designs. These designs are generally rotationally symmetric, with one or more concentric rings of different powers. A "center distance" lens provides full refractive correction for distance at the fovea (i.e., at the center of vision) through the central region of the lens. Surrounding that central region in one or more annular regions of increased "plus" correction power. That plus power can produce myopic defocus in the peripheral retina. Myopic defocus can also mean that the image of a distant object would be in the best focus in front of the retina, representing a "stop signal" to the eye to stop growing in length. A similar effect occurs with a clinical approach to myopia reduction called Orthokeratology, or "Ortho-K." In Ortho-K, an overnight contact lens is worn that physically contacts and flattens the central cornea, resulting in the steepening of the surrounding cornea. This can produce an optical profile similar to that of a center-distance bifocal contact lens [10,11]. The immediate effect is a reduction in myopia, but it has also been found to have the longer-term effect of slowing eye growth, a result consistent with the idea of myopia control via peripheral myopic defocus.

Figure 11B:
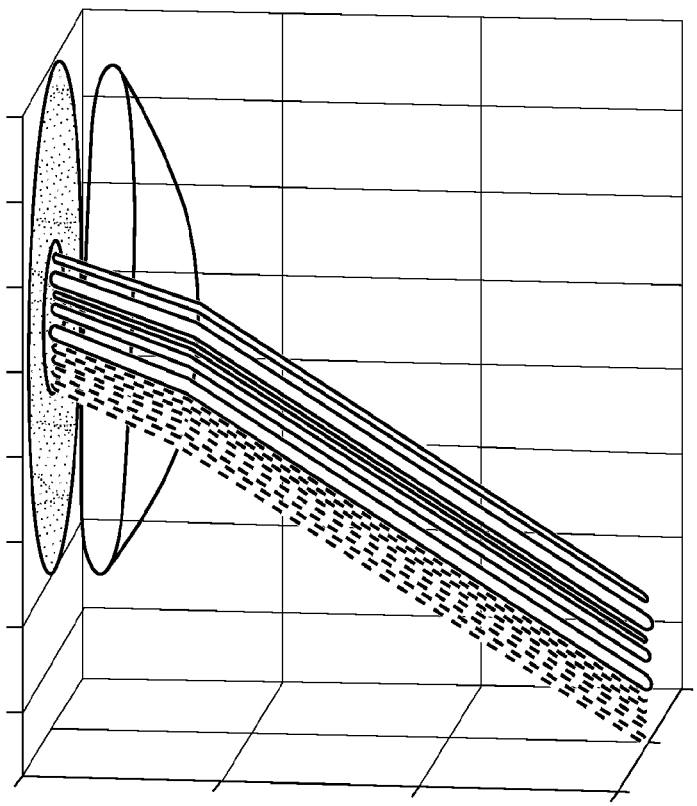

FIG. 11B illustrates the operation in which the peripheral region of the cornea (and contact lens) refracts the light that ultimately falls on the peripheral retina. FIG. 11B shows the cornea and iris/pupil of an eye, with a bundle of rays being refracted by that cornea and entering the pupil of the eye. FIG. 11B also shows that because the cornea is anterior to the pupil by approximately 4 mm, rays from the peripheral visual field are refracted by peripheral regions of the cornea.

Both processes of producing peripheral myopic defocus, either by a contact lens or Ortho-K, have been shown to slow the progression of myopia. The strength of the stop signal has also been shown to be related to the magnitude of myopic defocus [12]. It can be observed through ray-tracing analysis that a difference between the example myopia control ophthalmic device 100 and a concentric ring design is the quality of the retinal image formed by the lens in the retinal periphery. In the conventional annular ring design, there is increased dioptric power along the radial meridian but little or no increased power in the perpendicular meridian. That yields a dioptric power that is astigmatic. Indeed, in terms of stop signal strength, that power is only half of what it would be if the increased dioptric power occurred in both principal meridians of the annular region.

The multifocal contact lens design implements an annular region in which the power is the full power in all meridians. FIG. 9B (device 900c) shows one possible implementation of this type of design: the six surrounding zones each consist of a lens-like facet that has additional plus power in all meridians. In this implementation, those zones also compensate for oblique astigmatism present in a typical eye [13]. As a result, those regions have a toric curvature. This type of design, with plus power in all meridians, will produce myopic defocus in all meridians and thus a stronger stop signal to eye growth. Illustrated is one of many variations of this lens design: for example, the number of facets, the size of the central optical zone, the distance to the optical center of the facets, and the added power of the facets are all selectable.

Figure 11C:
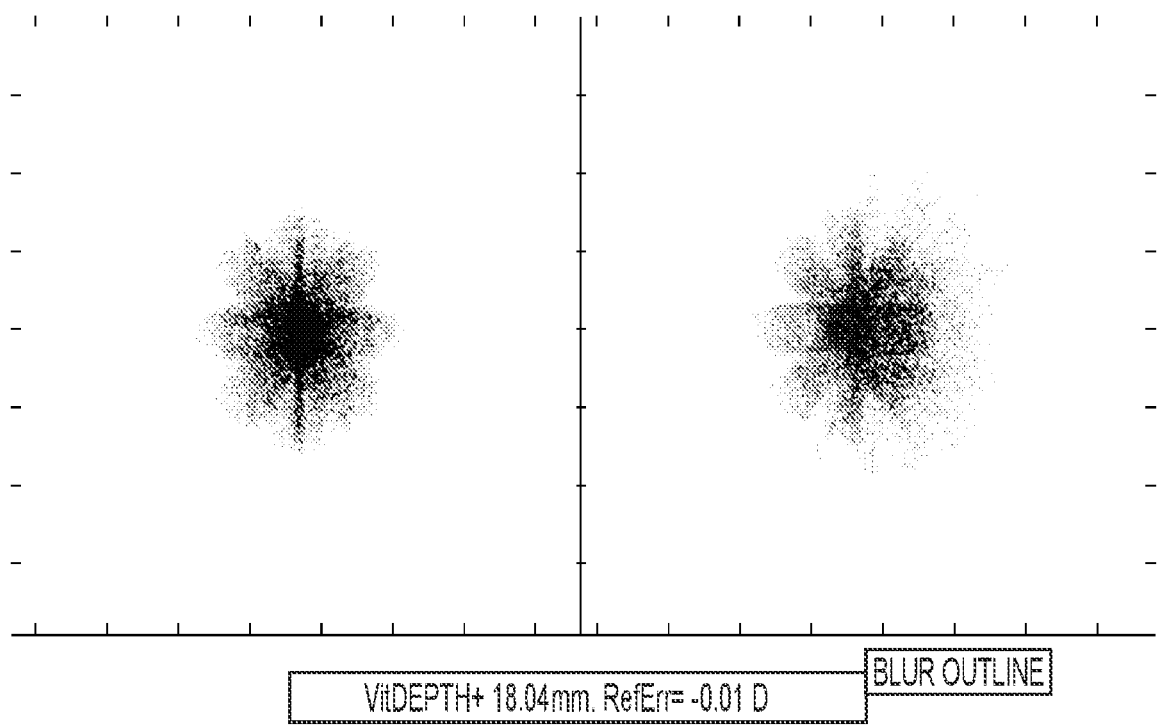
Figure 11D:
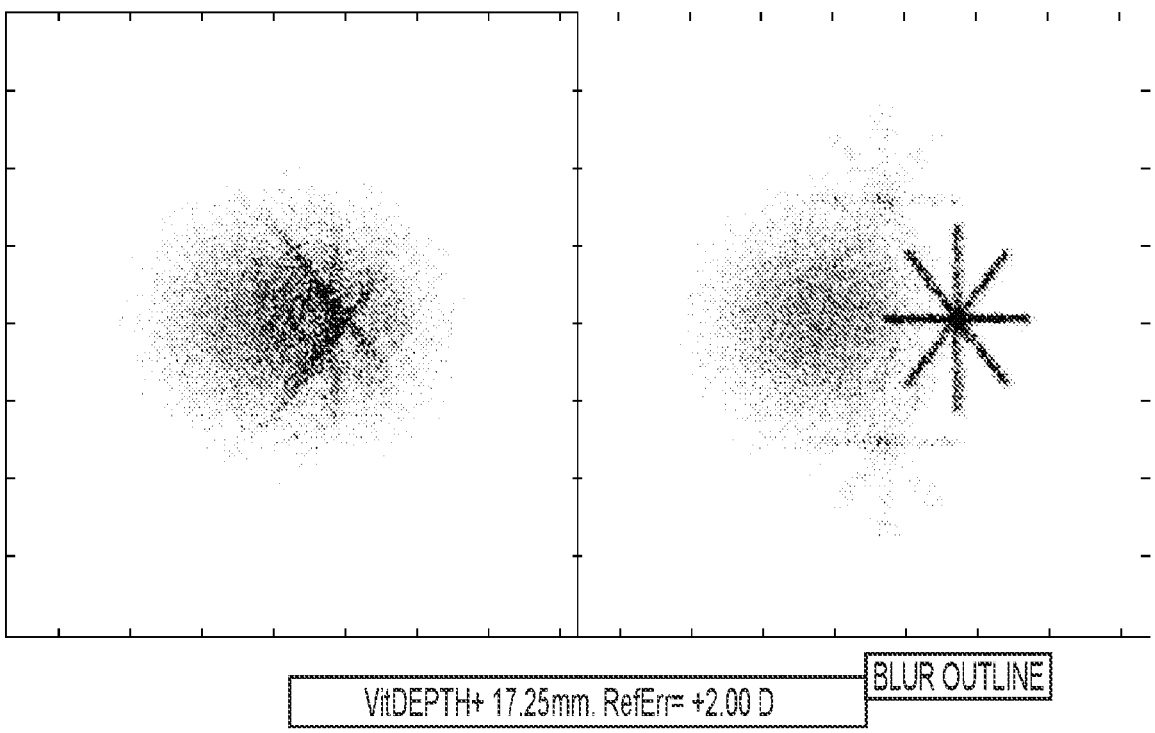

FIGS. 11C and 11D each illustrate additional simulated retinal images and show the results as a comparison between the concentric ring design and the example myopia control ophthalmic devices. FIG. 11C shows the image on the retina of a star target of 25 min arc angular size at a visual field angle of 25 degrees. The target is at optical infinity, and the eye is corrected for distance with the power of the central optical zone. The left and right panels are the images formed by the concentric ring and faceted designs, respectively. In each, the image composed of black dots is the image formed by the distance-corrected optical zone(s). Both are somewhat blurry because the peripheral astigmatism of the eye is uncorrected in the distance-correction zone. The images composed of blue dots are the images of the target formed by the annular regions with plus power. Because those regions provide myopic defocus, those images are blurred, but the amount of defocus is somewhat different between the left and right panels: the spread of the defocused image (blue dots) on the right is approximately 2× larger than that on the left, indicative of the greater magnitude of myopic defocus with the faceted design. In addition, there is a difference in the proportion of light being refracted by the near versus distance regions of the lens. At this visual field angle, in the faceted design, 35% of the light traverses the "add" portion of the lens compared to about 32% in the annular design.

FIG. 11D illustrates the same two lenses, with the image plane (i.e., the retina) moved forward to coincide with the nominal image plane of the added plus power. In this case, that is +2.00 D added power. Comparing the images composed of blue dots, it is seen that the faceted design produces images of much sharper focus. This is another aspect of the strength of the stop signal for eye growth: As target distances range from distance to near, in the peripheral retina, the distinction between what is out of focus (longer eye length) and what is in focus (shorter eye length) is much more distinct. This distinction between out-of-focus and in-focus imagery would lead to the expectation that the faceted design presents a stronger stop signal to the eye according to the understanding that peripheral myopic defocus affects eye growth.

Myopia Control Ophthalmic Device with Symmetrically Shaped Oval Facets: FIG. 9B shows views of the conventional multifocal lens 900c and the example myopia control ophthalmic device 100 (shown as 900d). The lens 900c includes two concentric rings to provide increased plus power. The central region provides full distance refractive correction, as does the second concentric ring. The rings with added power provide myopic defocus to the peripheral retina. The cross 902 shown over the profile of the lens intercepted by the horizontal line has the full amount of added plus power. The vertical line can be unchanged in curvature and therefore has effectively no increase in power. The result in lens 900c is an astigmatic power and a mean (or spherical equivalent) power that is only half of the nominal increase in power.

Figure 12A:
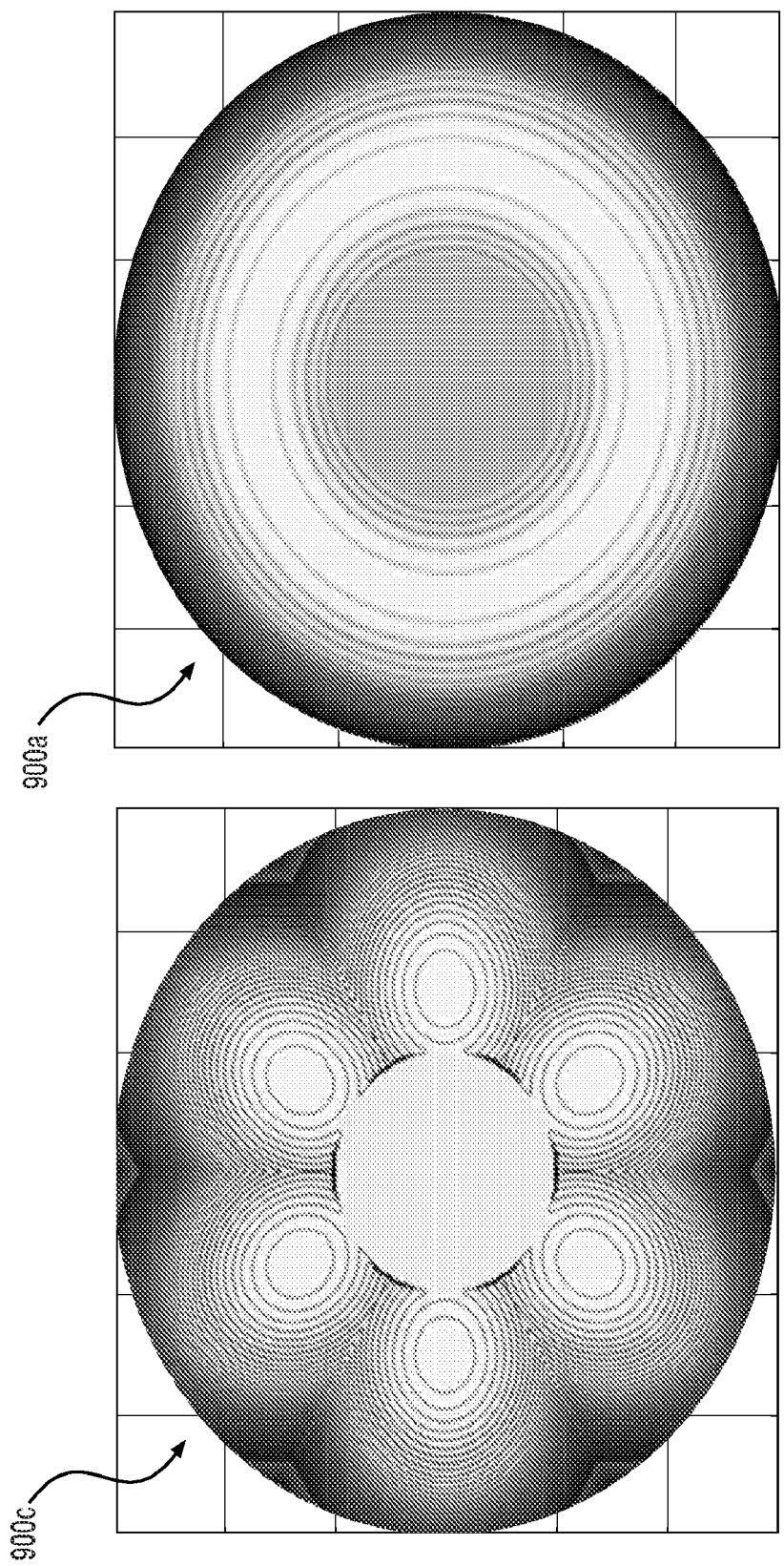
FIGS. 12A, 12B, 12C, 12D and 12E show ray tracing simulation results for the lens of FIG. 9B in accordance with an illustrative embodiment.
Figure 12B:
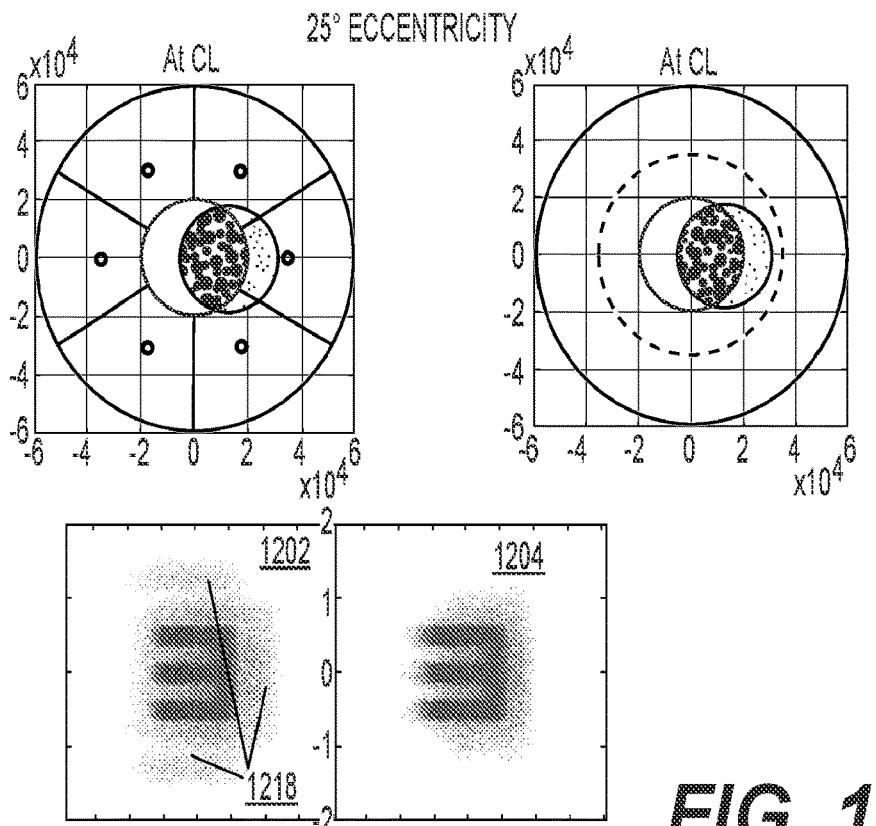
Figure 12C:
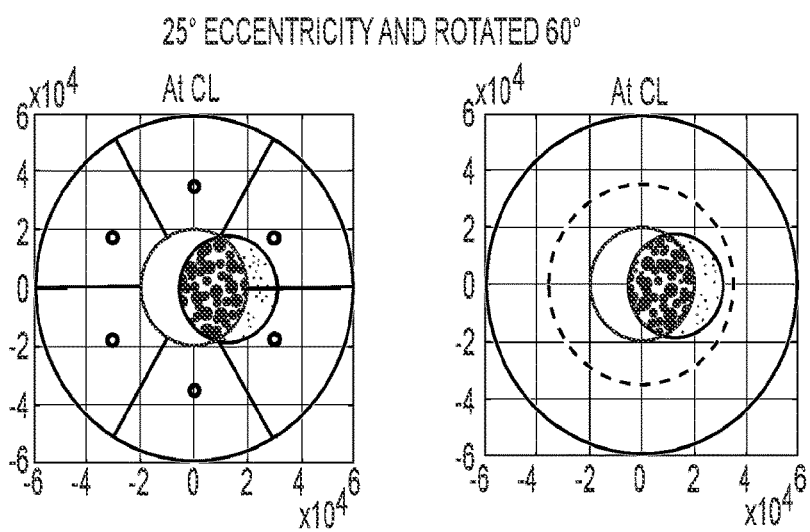
Figure 12D:
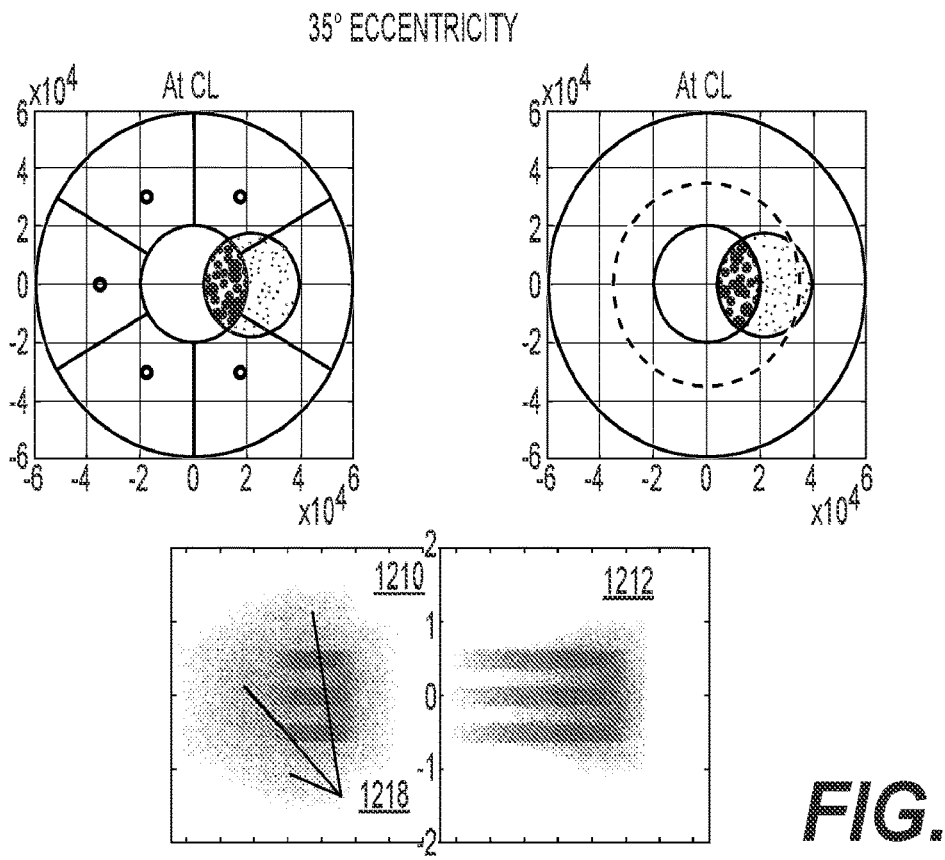
Figure 12E:
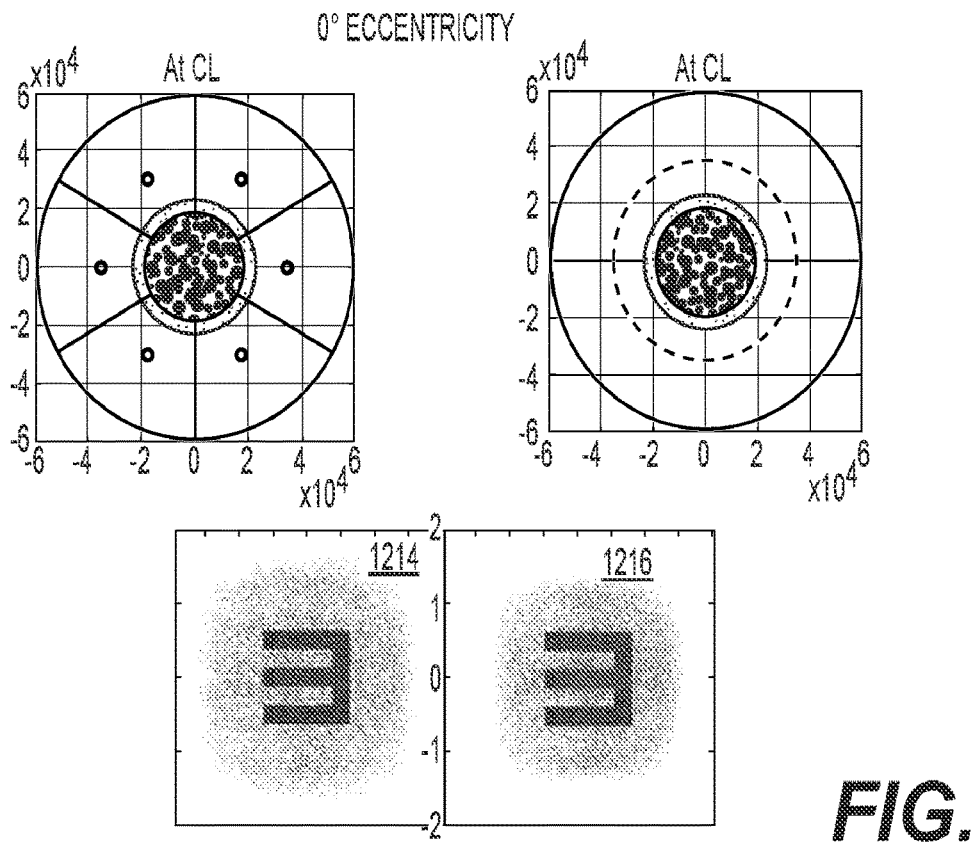

FIGS. 12A-12E shows myopia defocusing aspects via simulation ray tracing results for the myopia control ophthalmic device 100b of FIG. 3B (shown as 900c) and the ray-tracing results of the conventional lens design 900a of FIG. 9A. FIGS. 12B, 12D, and 12E show the ray-tracing results for the two lenses (100b and 900b) at 25° eccentricity (offset of visual field angle), 35° eccentricity, and at fovea vision.

Similar to the result of the myopia control ophthalmic device 900b of FIG. 9A, the reversed "E" has the same image quality, again owing to the fact that the central optical zone is identical for the two lenses. In FIGS. 12B and 12D, it can be observed that a greater proportion of the light traverses the lens through the surrounding region of the myopia control ophthalmic device 900b (see 1206, 1210) as compared to that of the ray trace 1204 of the 2-ring design (1208, 1212). Because the surrounding region associated with the facets 106 has a different power, it forms an out-of-focus image seen in the figures as the 'cloud' of points to the top, bottom, and right portion 1218 of the main image. In contrast, because of the discussed associated astigmatism of the ring design, a clear image is not formed for the viewing distance in the ray trace results 1204 and 1212. For the faceted lens results 1202, it can be observed that the image is clearly focused. The clear focus constitutes a much stronger stop signal for eye growth. And, thus, the myopia control ophthalmic device 900b could be much more effective as a myopia control lens.

In FIG. 12C, both the segmented facet lens design 100b of FIG. 12A and the conventional lens design of FIG. 2 are subjected to the offset of 25° visual field angle as FIG. 12B and also a lens rotation of 60°. The image quality of FIG. 12C in 1206 is nearly identical to that 1202 of FIG. 12B, indicating the segmented facet lens 106 is tolerant to rotation.

Although example embodiments of the present disclosure are explained in some instances in detail herein, it is to be understood that other embodiments are contemplated. Accordingly, it is not intended that the present disclosure be limited in its scope to the details of construction and arrangement of components set forth in the following description or illustrated in the drawings. The present disclosure is capable of other embodiments and of being practiced or carried out in various ways.

It must also be noted that, as used in the specification and the appended claims, the singular forms "a," "an," and "the" include plural referents unless the context clearly dictates otherwise. Ranges may be expressed herein as from "about"0 or "5 approximately" one particular value and/or to"about" or"approximately" another particular value. When such a range is expressed, other exemplary embodiments include the one particular value and/or to the other particular value.

By"comprising" or"containing" or"including," it meant that at least the name compound, element, particle, or method step is present in the composition or article or method but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the present disclosure. Similarly, it is also to be understood that the mention of one or more components in a device or system does not preclude the presence of additional components or intervening components between those components expressly identified.

As discussed herein, a"subject" may be any applicable human, animal, or other organisms, living or dead, or other biological or molecular structure or chemical environment, and may relate to particular components of the subject, for instance, specific tissues or fluids of a subject (e.g., human tissue in a particular area of the body of a living subject), which may be in a particular location of the subject, referred to herein as an"area of interest" or a"region of interest."

It should be appreciated that, as discussed herein, a subject may be a human or any animal. It should be appreciated that an animal may be a variety of any applicable type, including, but not limited thereto, mammal, veterinarian animal, livestock animal or pet type animal, etc. As an example, the animal may be a laboratory animal specifically selected to have certain characteristics similar to humans (e.g., rat, dog, pig, monkey), etc. It should be appreciated that the subject may be any applicable human patient, for example.

The term"about," as used herein, means approximately, in the region of, roughly, or around. When the term"about" is used in conjunction with a numerical range, it modifies that range by extending the boundaries above and below the numerical values set forth. In general, the term"about" is used herein to modify a numerical value above and below the stated value by a variance of 10% unless stated otherwise.

Similarly, numerical ranges recited herein by endpoints include subranges subsumed within that range (e.g. 1 to 5 includes 1-1.5, 1.5-2, 2-2.75, 2.75-3, 3-3.90, 3.90-4, 4-4.24, 4.24-5, 2-5, 3-5, 1-4, and 2-4). It is also to be understood that all numbers and fractions thereof are presumed to be modified by the term "about."

The following patents, applications, and publications as listed below and throughout this document, are hereby incorporated by reference in their entirety herein.

REFERENCES

[1] Smith E L, Kee C Su, Ramamirtham R, Qiao-Grider Y, Hung L F. Peripheral vision can influence eye growth and refractive development in infant monkeys. *Invest Ophthalmol Vis Sci.* 2005; 46(11):3965-3972.

[2] Chamberlain P, Peixoto-de-Matos S C, Logan N S, Ngo C, Jones D, Young G. A 3-year randomized clinical trial of MiSight lenses for myopia control. *Optom Vis Sci.* 2019; 96(8):556-567

[3] Aller T A, Liu M, Wildsoet C F. Myopia control with bifocal contact lenses: a randomized clinical trial. *Optom Vis Sci.* 2016; 93(4):344-352.

[4] Walline J J, Greiner K L, McVey M E, Jones-Jordan L A. Multifocal contact lens myopia control. *Optom Vis Sci.* 2013; 90(11): 1207-1214.

[5] Cheng X, Xu J, Chehab K, Exford J, Brennan N. Soft contact lenses with positive spherical aberration for myopia control. *Optom Vis Sci.* 2016; 93(4):353-366.

[6] Walline J J. Myopia control: a review. *Eye Contact Lens.* 2016; 42(1):3-8.

[7] Song H, Chui T Y P, Zhong Z, Elsner A E, Burns S A. Variation of cone photoreceptor packing density with retinal eccentricity and age. *Invest Ophthalmol Vis Sci.* 2011; 52(10):7376-7384.

[8]. Park H Na, Jabbar S B, Tan C C, et al. Visually-driven ocular growth in mice requires functional rod photoreceptors. *Invest Ophthalmol Vis Sci.* 2014; 55(10):6272-6279. doi: 10.1167/iovs. 14-14648

[9] Cheng D, Woo G C, Drobe B, Schmid K L. Effect of bifocal and prismatic bifocal spectacles on myopia progression in children: three-year results of a randomized clinical trial. *JAMA Ophthalmol.* 2014; 132(3):258-264.

[10] Lipson M J, Brooks M M, Koffler B H. The role of orthokeratology in myopia control: a review. *Eye Contact Lens.* 2018; 44(4):224-230.

[11] Si J K, Tang K, Bi H S, Guo D D, Guo J G, Wang X R. Orthokeratology for myopia control: a meta-analysis. *Optom Vis Sci.* 2015; 92(3):252-257.

[12] Walline J J, Walker M K, Mutti D O, et al. Effect of high add power, medium add power, or single-vision contact lenses on myopia progression in children: the BLINK randomized clinical trial. *Jama.* 2020; 324(6):571-580.

[10] Liu T, Thibos L N. Variation of axial and oblique astigmatism with accommodation across the visual field. *J Vis.* 2017; 17(3):24-24.

What is claimed:

1. A method for providing myopia control in an individual, comprising providing the individual with an ophthalmic device comprising a central region configured to correct vision at a first correction power and a peripheral region that surrounds the central region,
    wherein the peripheral region comprises a plurality of distinct facet surfaces, each of the plurality of distinct facet surfaces having varying correction power relative to the first correction power of the central region in both (i) a first direction radially extending from a central location of the central region to a perimeter of the ophthalmic device, and (ii) a second direction perpendicular to the first direction,
    wherein the plurality of distinct facet surfaces produce a myopia defocus as a stop signal to therapeutically slow or stop myopia development,
    wherein each of the plurality of distinct facet surfaces has (i) a spherical shape, or (ii) a toric surface shape with oval or elliptical height contour, and
    wherein each of the plurality of distinct facet surfaces extends from the central region towards a periphery of the device and borders adjacent facet surfaces.

2. The method of claim 1, wherein the plurality of distinct facet surfaces are identical and equally spaced annularly with one another.

3. The method of claim 1, wherein the plurality of distinct facet surfaces have a toric surface shape with oval or elliptical height contour, each facet surface being located at a meridian that is equally spaced annularly with the other facet surfaces.

4. The method of claim 1, wherein each of the plurality of distinct facet surfaces has a correction area that is sufficiently large to provide correction to the eye for a region of the peripheral visual field.

5. The method of claim 1, wherein at least one of the plurality of distinct facet surfaces has a spherical shape.

6. The method of claim 1, wherein at least one of the plurality of distinct facet surfaces has a toric surface shape with oval or elliptical height contour.

7. The method of claim 1, wherein the plurality of distinct facet surfaces are each located at a same radial position.

8. The method of claim 1, wherein one or more of the plurality of distinct facet surfaces are located at different radial positions.

9. The method of claim 1, wherein each facet is a wedge-shaped segment with a truncated vertex adjacent the central region.

10. An ophthalmic device comprising a central region configured to correct vision at a first correction power and a peripheral region that surrounds the central region,
    wherein the peripheral region comprises a plurality of distinct facet surfaces, each of the plurality of distinct facet surfaces having varying correction power relative to the first correction power of the central region in both (i) a first direction radially extending from a central location of the central region to a perimeter of the ophthalmic device and (ii) a second direction perpendicular to the first direction,
    wherein the plurality of distinct facet surfaces produce a myopia defocus as a stop signal to therapeutically slow or stop myopia development,
    wherein each of the plurality of distinct facet surfaces has (i) a spherical shape, or (ii) a toric surface shape with oval or elliptical height contour, and
    wherein each of the plurality of distinct facet surfaces extends from the central region towards a periphery of the device and borders adjacent facet surfaces.

11. The device of claim 10, wherein the plurality of distinct facet surfaces are identical and equally spaced annularly with one another.

12. The device of claim 10, wherein the plurality of distinct facet surfaces have a toric surface shape with oval or elliptical height contours, each facet surface being located at a meridian that is equally spaced annularly with the other facet surfaces.

13. The device of claim 10, wherein each of the plurality of distinct facet surfaces has a correction area that is sufficiently large to provide correction to the eye for a region of the peripheral visual field.

14. The device of claim 10, wherein at least one of the plurality of distinct facet surfaces has a spherical shape.

15. The device of claim 10, wherein at least one of the plurality of distinct facet surfaces has a toric surface shape with oval or elliptical height contours.

16. The device of claim 10, wherein the plurality of distinct facet surfaces each has a set of height contours, wherein a topmost contour has a center positioned at a same radial position with each nearby facets.

17. The device of claim 10, wherein one or more of the plurality of distinct facet surfaces each has a set height contour, wherein a top most contour has a center positioned at a different radial position with a nearby facet.

18. The device of claim 10, wherein the plurality of distinct facet surfaces comprises 4-16 facet surfaces.

19. The device of claim 18, wherein the plurality of distinct facet surfaces are identical and equally spaced annularly with one another.

20. The device of claim 19, wherein each of the plurality of distinct facet surfaces has a toric surface shape with oval or elliptical height contours.

21. The device of claim 20, wherein the plurality of distinct facet surfaces are each located at a same radial position.

22. The device of claim 20, wherein the plurality of distinct facet surfaces comprises 8 or 10 facet surfaces.

23. The device of claim 19, wherein each of the plurality of distinct facet surfaces has a spherical shape.

24. The device of claim 23, wherein the plurality of distinct facet surfaces are each located at a same radial position.

25. The device of claim 23, wherein the plurality of distinct facet surfaces comprises 8 or 10 facet surfaces.

26. The device of claim 10, wherein the device is a contact lens.

27. The device of claim 10, wherein the device is a spectacle lens.

28. The device of claim 10, wherein the central region is defined by a first area and a first facet surface of the plurality of distinct facet surfaces is defined by a second area, and wherein a ratio of the second area of the first facet surface to the first area of the central region is between about 30% and about 150%.

29. The device of claim 10, wherein the central region and the plurality of facets encircle the region for image formation across a visual field.

30. The device of claim 10, wherein the plurality of distinct facet surfaces comprises 8 or 10 facet surfaces and each of the plurality of distinct facet surfaces has a toric surface shape with oval or elliptical height contours.

31. The device of claim 30, wherein the device is a spectacle lens.

32. The device of claim 10, wherein each facet is a wedge-shaped segment with a truncated vertex adjacent the central region.

33. A method for designing an ophthalmic device for myopia control, the method comprising:
- obtaining, by a processor, a set of parameters; and
- generating, by the processor, using the set of parameters, an ophthalmic device design comprising a central region configured to correct vision at a first correction power and a peripheral region that surrounds the central region,
- wherein the peripheral region comprises a plurality of distinct facet surfaces, each of the plurality of distinct facet surfaces having varying correction power relative to the first correction power of the central region in both (i) a first direction radially extending from a central location of the central region to a perimeter of the ophthalmic device and (ii) a second direction perpendicular to the first direction,
- wherein the plurality of distinct facet surfaces produce a myopia defocus as a stop signal to therapeutically slow or stop myopia development,
- wherein each of the plurality of distinct facet surfaces has (i) a spherical shape, or (ii) a toric surface shape with oval or elliptical height contour, and wherein each of the plurality of distinct facet surfaces extends from the central region towards a periphery of the device and borders adjacent facet surfaces.

34. The method of claim 33, wherein each facet is a wedge-shaped segment with a truncated vertex adjacent the central region.

35. A method for fabricating an ophthalmic device for myopia control, wherein the ophthalmic device design produced by the method of claim 33 is used to fabricate the ophthalmic device.

* * * * *